(12) United States Patent
Shawver

(10) Patent No.: US 9,637,063 B1
(45) Date of Patent: *May 2, 2017

(54) VIBRATION CANCELLING PLATFORM FOR USE WITH LAPTOPS OR TABLET COMPUTERS USED IN MOVING VEHICLES

(71) Applicant: Michael Shawver, Mill Valley, CA (US)

(72) Inventor: Michael Shawver, Mill Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/213,251

(22) Filed: Jul. 18, 2016

Related U.S. Application Data

(63) Continuation-in-part of application No. 14/508,545, filed on Oct. 7, 2014, now Pat. No. 9,395,040.

(51) Int. Cl.
| | |
|---|---|
| *A47B 37/00* | (2006.01) |
| *B60R 11/02* | (2006.01) |
| *F16M 13/02* | (2006.01) |
| *A47B 23/04* | (2006.01) |
| *F16F 15/04* | (2006.01) |

(52) U.S. Cl.
CPC .......... *B60R 11/0252* (2013.01); *A47B 23/04* (2013.01); *F16F 15/04* (2013.01); *F16M 13/02* (2013.01)

(58) Field of Classification Search
CPC ...................................................... A47B 11/00
USPC .......... 108/94, 103, 104; 361/679.46–679.55
See application file for complete search history.

(56) References Cited

U.S. PATENT DOCUMENTS

| | | |
|---|---|---|
| 2,830,862 A | 1/1956 | Wright |
| 3,541,976 A | 11/1970 | Rozas |
| 3,922,973 A | 12/1975 | Sturgeon |
| 5,239,971 A | 8/1993 | Uchinami |
| 5,379,990 A | 1/1995 | Ando et al. |
| 5,553,824 A | 9/1996 | Dutra |
| 5,553,834 A | 9/1996 | Je |
| 6,426,935 B1 | 7/2002 | Imai et al. |
| 6,682,038 B2 | 1/2004 | Golynsky |
| 6,719,258 B2 | 4/2004 | Bryngelson et al. |
| 7,038,909 B1 | 5/2006 | Chen |
| 8,371,237 B2 | 2/2013 | Weber |
| 8,474,778 B2 | 7/2013 | Jacobson |

(Continued)

*Primary Examiner* — Matthew Ing
(74) *Attorney, Agent, or Firm* — Steven A. Nielsen; www.NielsenPatents.com

(57) ABSTRACT

Use of a laptop, tablet or other electronic device within a vehicle or other mode of transportation is often made difficult due to vibration, bumps and sudden turns. A vibration cancelling platform provides stabilization for an electronic device while being used in a moving vehicle. A platform may comprise a top housing and a bottom housing which may slide laterally relative to each other in order to stabilize a user's electronic device resting upon the top housing. Low friction sliding components such as linear slides or rollers help to reduce or prevent the environmental movement experienced by the bottom housing from being transmitted to the upper housing. Spring elements secured between the top and bottom housings further assist in reducing vibration and act to stabilize the top housing in a centralized position. The platform may comprise two or more sections that slide open and expand the platform size to accommodate laptops of different sizes.

6 Claims, 30 Drawing Sheets

(56) References Cited

U.S. PATENT DOCUMENTS 9,395,040 B1 * 7/2016 Shawver
2012/0248049 A1 10/2012 Moore

* cited by examiner

VIBRATION CANCELLING PLATFORM FOR USE WITH LAPTOPS OR TABLET COMPUTERS USED IN MOVING VEHICLES

RELATED PATENT APPLICATION AND INCORPORATION BY REFERENCE

This is a utility application is a continuation-in-part of U.S. patent application Ser. No. 14/508,545 filed on Oct. 7, 2014. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic, cited or referred to in this application.

BACKGROUND OF THE INVENTION (1) Field of the Invention

The invention generally relates to vibration cancelling systems. More particularly, the invention relates to the manufacture and use of stabilization systems to facilitate the use of portable electronics by consumers while in transit.

(2) Description of the Related Art

Other portable desk or support systems are known. For example, U.S. Pat. No. 3,541,976 issued to Rozas on Nov. 24, 1970 discloses a portable desk attached to a user's neck and torso. U.S. Pat. No. 3,922,973 issued to Sturgeon on Dec. 2, 1975 discloses a desk for use in vehicles, the desk having a swivel for rotation.

U.S. Pat. No. 5,379,990 issued to Ando et al on Jan. 10, 1995 discloses the use of springs or resilient members to dampen the movement of a chassis attached to a housing. Ando fails to disclose or contemplate any form of free sliding movement.

U.S. Pat. No. 6,719,258 issued to Bryngelson et al on Apr. 13, 2004 discloses a pivot linkage assembly and air spring assembly in a car seat system. The structure of Bryngelson is unartful and not practical for use with portable electronic devices.

U.S. Pat. No. 8,480,052 issued to Taylor et al on Jul. 9, 2013 discloses a vibration isolating device using vertical springs only.

BRIEF SUMMARY OF THE INVENTION

Using a laptop computer or other device while traveling may be challenging due to vibrations, shaking, turns and bumps that are typically encountered while riding in cars, buses, RVs, trains, airplanes and other modes of transportation. More specifically, a table mounted to a moving vehicle may act as a cantilever and amplify vibrations to laptop computer sitting upon the table. Whether resting upon a table or a user's lap, a laptop computer is typically subjected to unpleasant movement that hinders the use of the computer and concentration of the user. In many modes of transportation it is nearly impossible to view a laptop screen and use a keyboard and mouse due to the abrupt accelerations, decelerations, vibrations and other movements.

The presently disclosed embodiments solve long felt shortfalls in the art by presenting an unobvious and unique combination, configuration and use of components to provide a portable vibration canceling platform for use with laptop computers and other devices used in mobile environments. Disclosed embodiments mitigate and/or cancel vibrations or shaking that typically occurs to computers used upon tables mounted to a vehicle.

The presently disclosed embodiments overcome shortfalls in the art by presenting a new platform or device that comprises a bottom housing artfully connected to a top housing such that the two housings enjoy nearly unrestricted lateral motion with respect to one another. Shortfalls in the art are further overcome by use of centering components, such as springs or elastic members that gently return the top housing to a neutral position and absorb movement transmitted to the bottom housing. Optional extendable mouse pads further add to the utility of the disclosed embodiments.

An alternative embodiment comprises a left and right top housing and a left and right bottom housing, where the top and bottom housings may be expanded and retracted from each other to allow for usage with small and large laptops and also to provide a computer mouse surface.

Embodiments include the use of rollers, roller support journals, bumpers, springs or elastic members and other components advantageously configured.

An alternative embodiment roller journals are replaced by rollers, with the rollers in direct rolling contact with the underside of a top housing and top side of a bottom housing. An especially compact design is achieved by use of guide plate that guides and separates the rollers in lieu of a cage and race configuration.

Another alternative embodiment rollers, roller journals and guide plates are replaced by ball bearing slides.

Disclosed embodiments overcome shortfalls in the prior art as slides and springs compensate or diminish the perceived differential movement of a laptop on the top surface with the environmental movement of the bottom housing.

Figure 1:
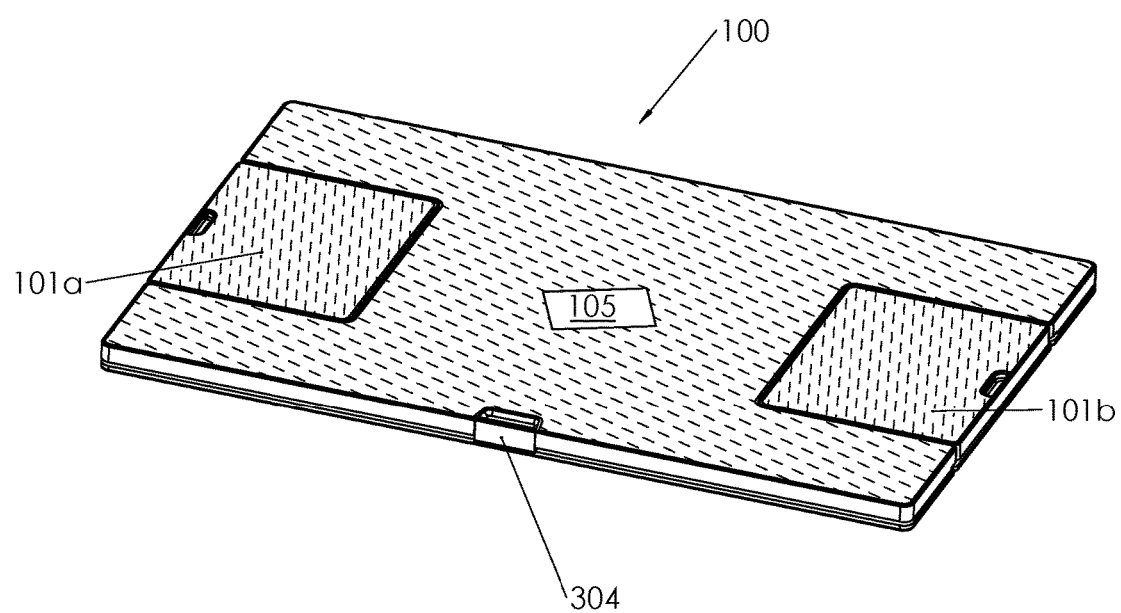
FIG. 1 depicts a top view of a platform with the mouse pads retracted.

REFERENCE NUMERALS IN THE DRAWINGS 50 laptop computer or other device
51 computer mouse
52 mobile phone
100 platform
101a extendable mouse pad—right side
101b extendable mouse pad—left side
102 detachable mouse pad
105 top surface of platform 100
200 platform top housing assembly
201 platform top housing
202 roller
203 mouse pad top housing
204(a-b) mouse pad anti-slip pad
205 platform anti-slip pad
206 spring
207 lateral guide bearing
208 end of travel stop surface
209 roller support journal
210a spring anchor point of top housing—right side
210b spring anchor point of top housing—left side
211 platform top housing
220 lateral track
221 mouse pad lateral track
225 lateral bearing race pin
300 platform bottom housing assembly
301 platform bottom housing
302a mouse pad bottom housing
302b mouse pad bottom housing
303(a-b) stiffener plate
304 locking latch
305 foot pad
306 stop bumper
307(a-b) spring anchor
308 ball bearing slide
309 adjustable spring anchor
311 roller guide
312 free roller
320 center plane section of platform bottom housing 301
321 rail plane section of platform bottom housing 301
322 stiffener rib
335 mouse skirt
337 stiffener of mouse skirt 335
350 free roller void
400 vehicle mounted table
500 directional arrow—to the left
501 directional arrow—to the right
502 directional arrow—to the right and left
503 directional arrow—in, toward the body of the platform
504 directional arrow—out, away from the body of the platform
510 directional arrow—to the right to increase spring tension
515 directional arrow—to the left to decrease spring tension
600 expandable platform
600a right side of expandable platform 600
600b left side of expandable platform 600
601 top surface of expandable platform 600
601a right hand top surface of expandable platform 600
601b left hand top surface of expandable platform 600
700(a-b) top housing assembly of expandable platform 600
701 expandable platform top housing
702(a-d) ball bearing slide
703 (a-d) spring
704 top housing hard stop post
705 top housing slide lock latch
706 lock latch pivot
707(a-d) spring anchor point top housing
708 top housing magnet
800 expandable platform bottom housing assembly
801 expandable platform bottom housing
802(a-d) extension plate guide 803a extension plate latch of the right side of expandable platform 600
803b extension plate latch of the left side of expandable platform 600
804(a-d) extension plate hard stop post
805 extension plate end of travel stop surface—retracted
806 extension plate end of travel stop surface—extended
807(a-d) spring anchor point bottom housing
808(a-d) top housing end of travel stop surface—right travel
809(a-d) top housing end of travel stop surface—left travel
810 foot pad
811 lock latch locking post
812 extension plate
813 extension plate latch locking surface
814 latch locking surface
815 lead in ramp
900 directional arrow—to the right
901 directional arrow—to the left
902 direction arrow—upwards
903 directional arrow—to the left
904 directional arrow—to the right
1100 mono version platform
1110 top surface of mono version platform
1120 mono version platform top housing
1123 mono version platform bottom housing These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Referring to FIG. 1, a platform 100 for mounting or supporting a laptop computer, tablet computer or other device is depicted with integrated extendable mouse pads 101a and 101b and a locking latch 304. A platform 100 may comprise a top surface 105 used to support a laptop computer, tablet computer or other device.

Figure 2:
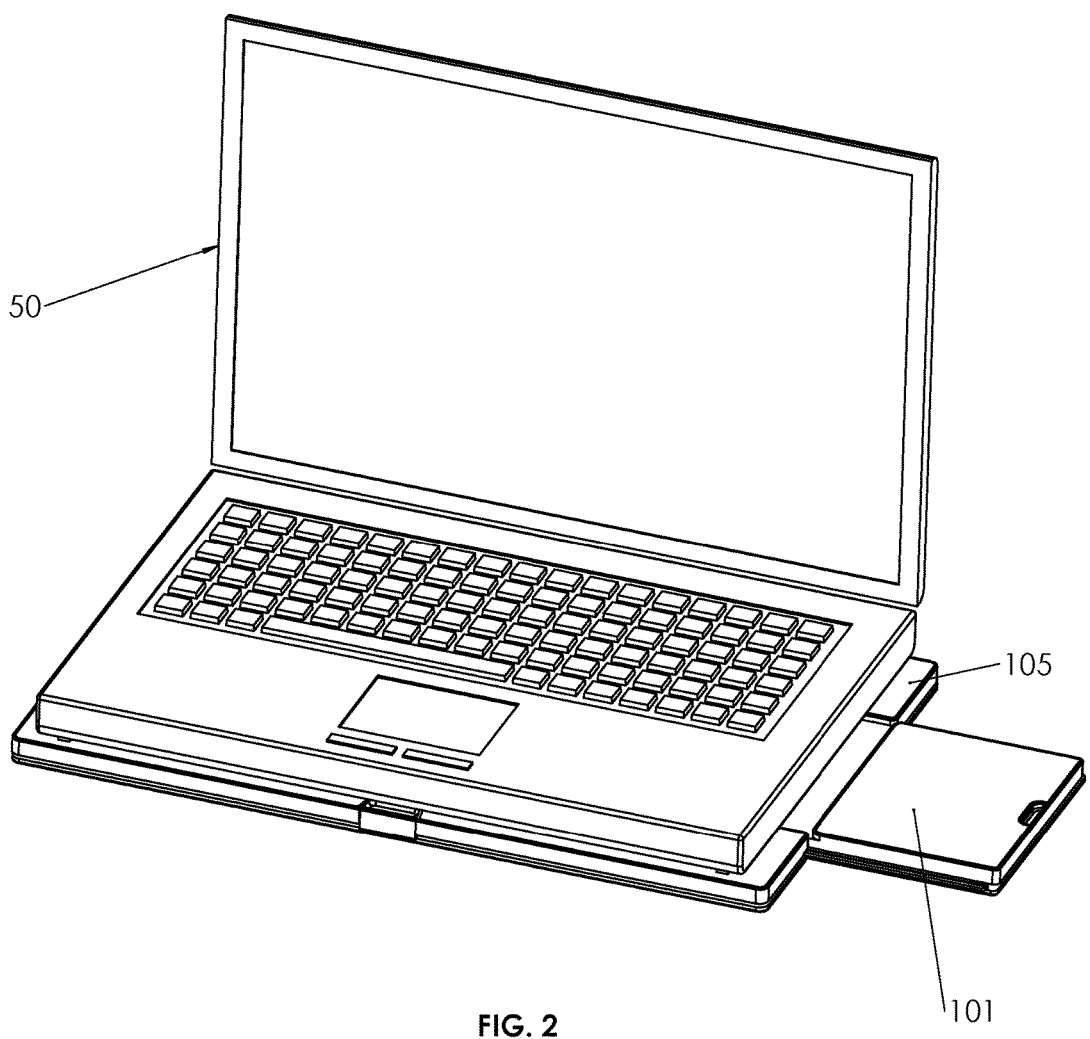
FIG. 2 depicts a top perspective view of a laptop resting upon a platform.

FIG. 2 depicts a platform 100 with a laptop 50 resting on the top surface 105 of the platform and with the right integrated mouse pad 101 in an extended position.

Figure 3:
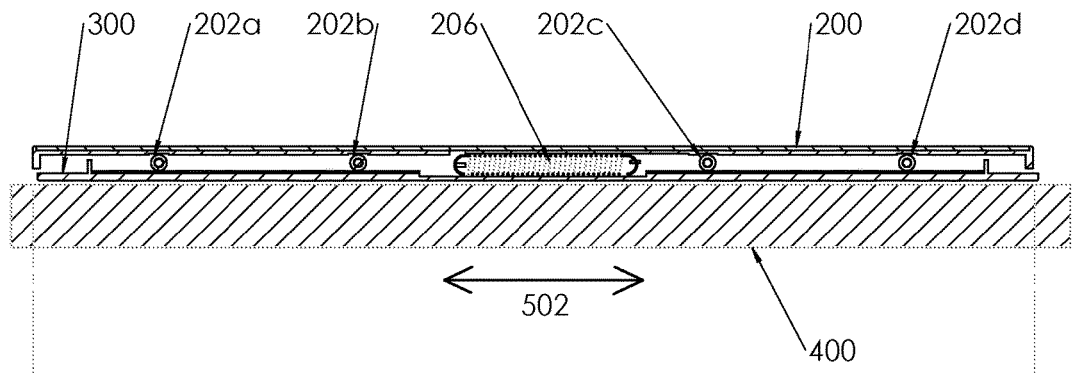
FIG. 3 depicts is a front cross sectional view of a platform resting upon a vehicle mounted table.

FIG. 3 depicts a front cross sectional view of a platform 100 and shows the top housing assembly 200 with mounted rollers 202(a-c) resting on the bottom housing 300. The platform is show resting on a table 400, wherein the table 400 is mounted in a vehicle, such as a bus or train. The table 400, will vibrate left to right as the vehicle moves along the road. The rollers 202(a-c) enable low friction lateral movement between the top housing assembly 200 and the bottom housing assembly 300. Directional arrow 502 indicates that the bottom housing may move left or right in reference to the top housing.

Also shown is one of the two springs 206 or resilient members being anchored to the top housing assembly at one end and the bottom housing assembly at the other end. The two springs 206 are used for stabilizing the top housing, and thus laptop or tablet, in a steady position relative to earth and the user as the bottom housing, which is resting on the table mounted in a vehicle, is shaking or vibrating left to right. The preferred embodiment displays springs 206 as extension springs, but the springs may also be compression or leaf springs or any other resilient component.

Figure 4:
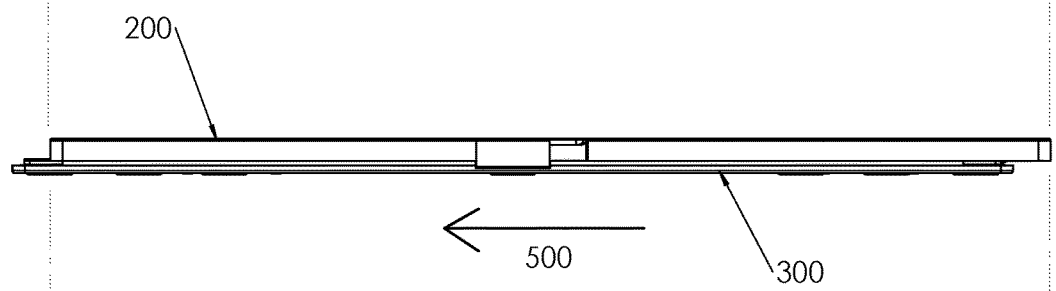
FIG. 4 depicts a front view of the platform showing the bottom housing moved to the left.

FIG. 4 depicts a bottom housing assembly 300 shifted to the left as the top housing assembly 200 maintains a steady position.

Figure 5:
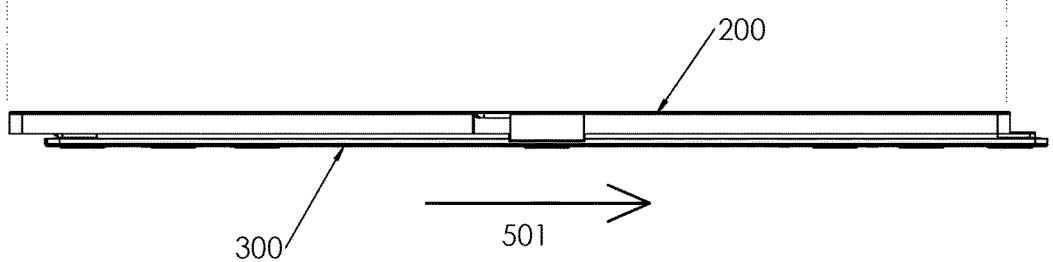
FIG. 5 depicts a front view of the platform showing the bottom housing moved to the right.

FIG. 5 depicts the bottom housing assembly 300 shifted to the right as the top housing assembly 200 maintains a steady position.

Figure 6:
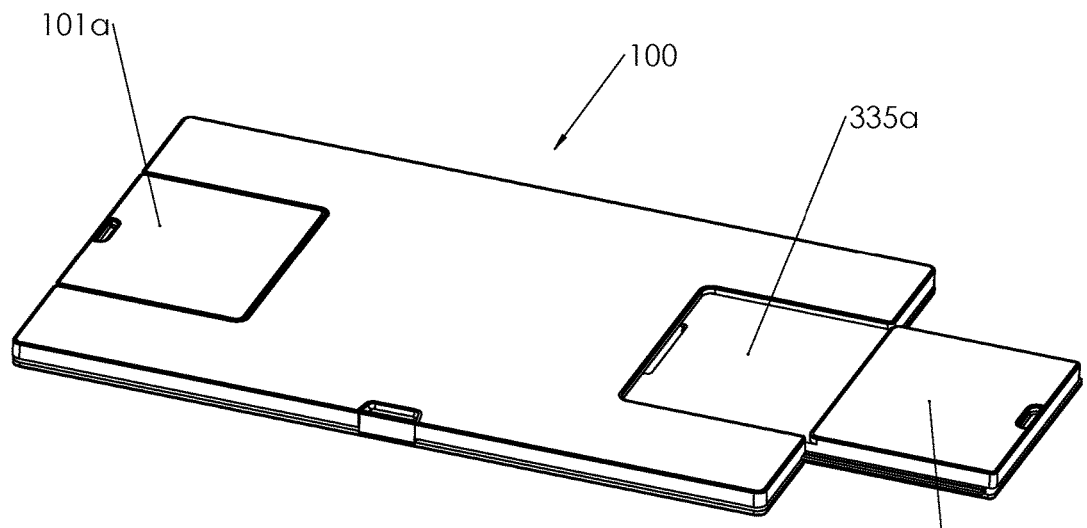
FIG. 6 depicts a top perspective view of a platform with a right mouse pad extended.

FIG. 6 depicts the platform 100 and the right side extendable mouse pad 101b pulled out for use with a computer mouse, the computer mouse not shown.

Figure 7:
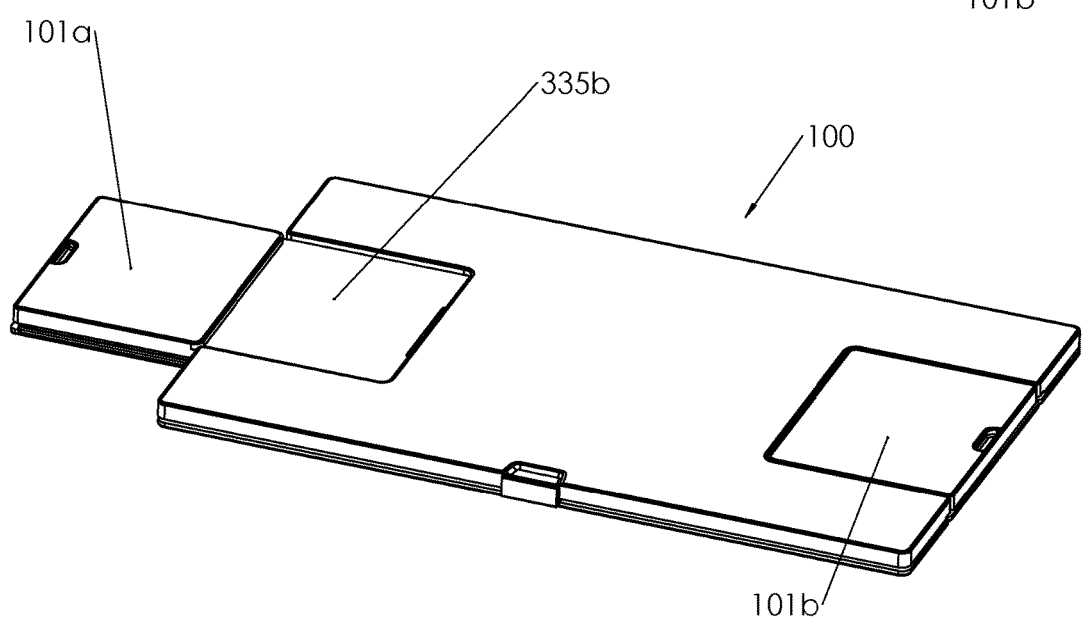
FIG. 7 depicts a top perspective view of a platform with a left mouse pad extended.

FIG. 7 depicts the platform 100 and the left side extendable mouse pad 100a pulled out for use with a computer mouse, the computer mouse not shown.

Figure 8:
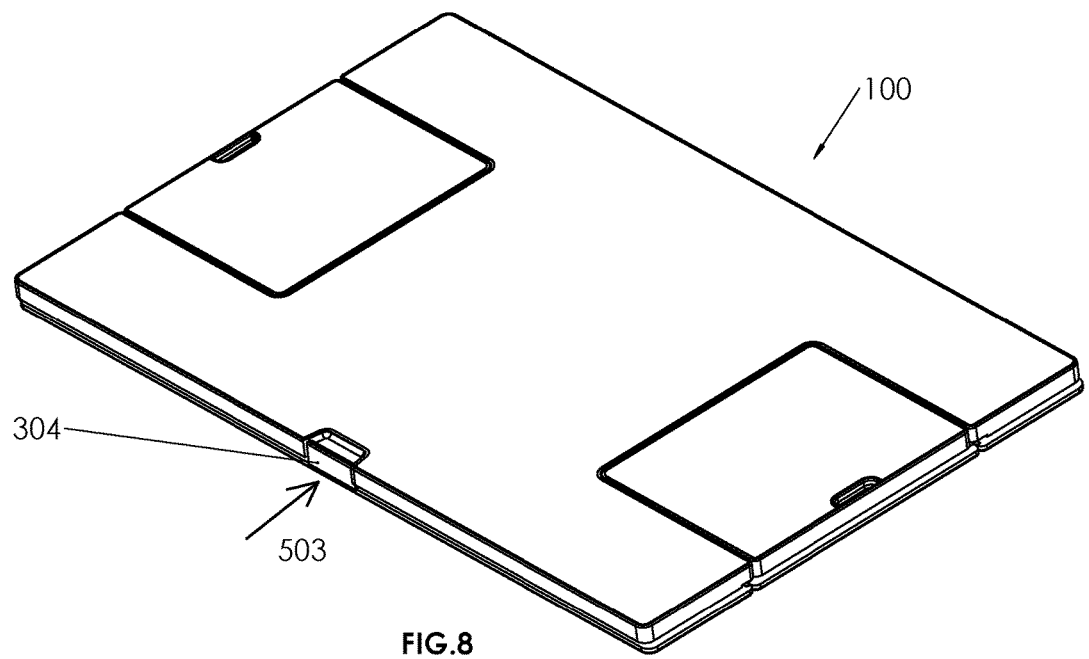
FIG. 8 depicts a top perspective view of a platform with a locking latch in a locked position.

FIG. 8 depicts a platform 100 and a locking latch 304 in the locked position. The latch locks the top housing assembly 200 to the bottom housing assembly 300. This feature is useful for stowing and carrying the platform and for momentarily turning off the anti-vibration feature while the laptop or tablet are not in use in the vehicle. Directional arrow 503 indicates that the locking latch has been moved to an inward position.

Figure 9:
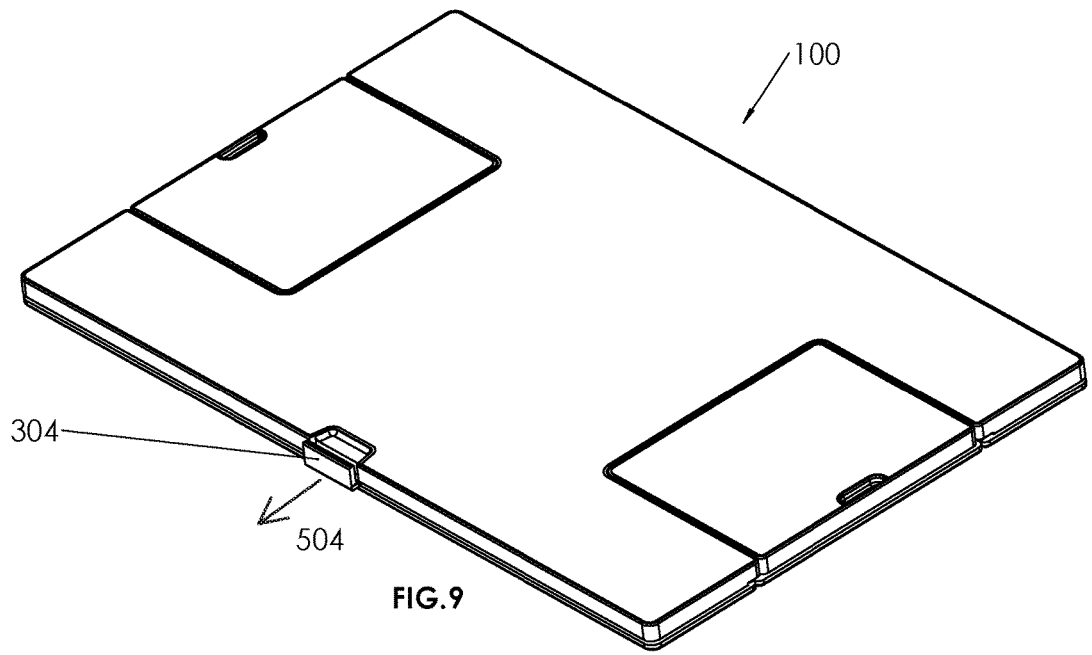
FIG. 9 depicts a top perspective view of a platform with a locking latch in an unlocked position.

FIG. 9 depicts the platform 100 and the locking latch 304 in the unlocked position. This allows the top housing assembly to laterally articulate relative to the bottom housing assembly. Directional arrow 504 indicates that the locking latch has been moved to an outward position.

Figure 10:
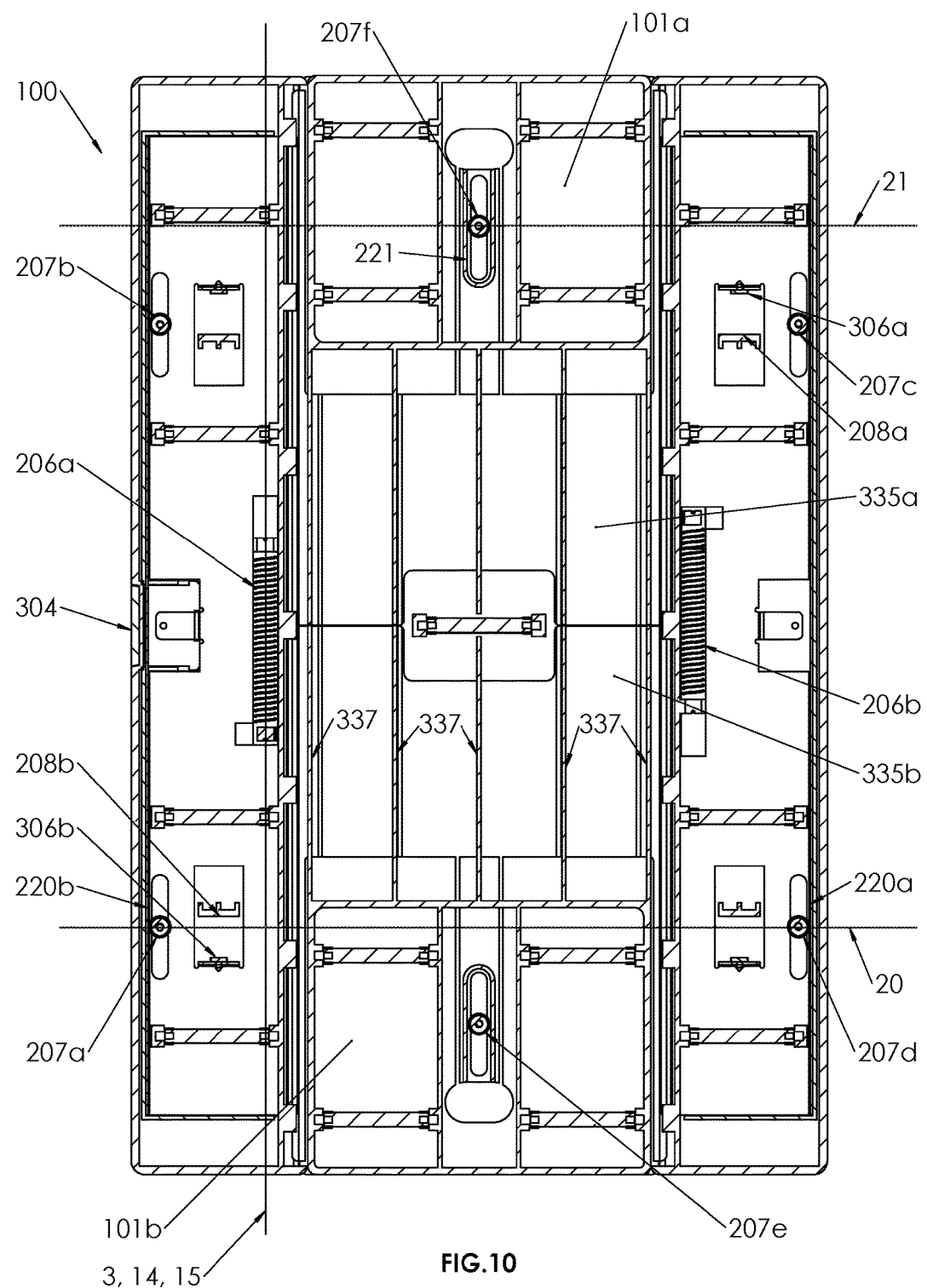
FIG. 10 depicts a top cross sectional view showing rollers, springs and stop bumpers.

FIG. 10 depicts a top cross sectional view of a platform 100 and mouse pads 101a and 101b. This view shows a plurality rollers 202(a-c) and two stabilizing springs 206. Stabilizing springs may be made of any resilient material. Also shown are four bumpers 306 and four end of travel stop surfaces 208. The bumpers 306 provide a cushioned stop for the end of travel of the top housing assembly to the left and right. The bumpers 306 are needed for large momentary vibrations from the vehicle and for hard right and left turns of the vehicle.

FIG. 10 further depicts each of the two springs 206(a-b) having a first end attached to the upper housing and a second end attached to the lower housing. A plurality of rollers 202 assist in the support and free sliding between the mouse pad top housing 203 and the mouse pad bottom housing 302.

FIG. 10 further depicts locking latch 304, lateral guide bearings 207, lateral tracks 220, stiffeners 337 of a mouse skirt and other components.

Figure 11:
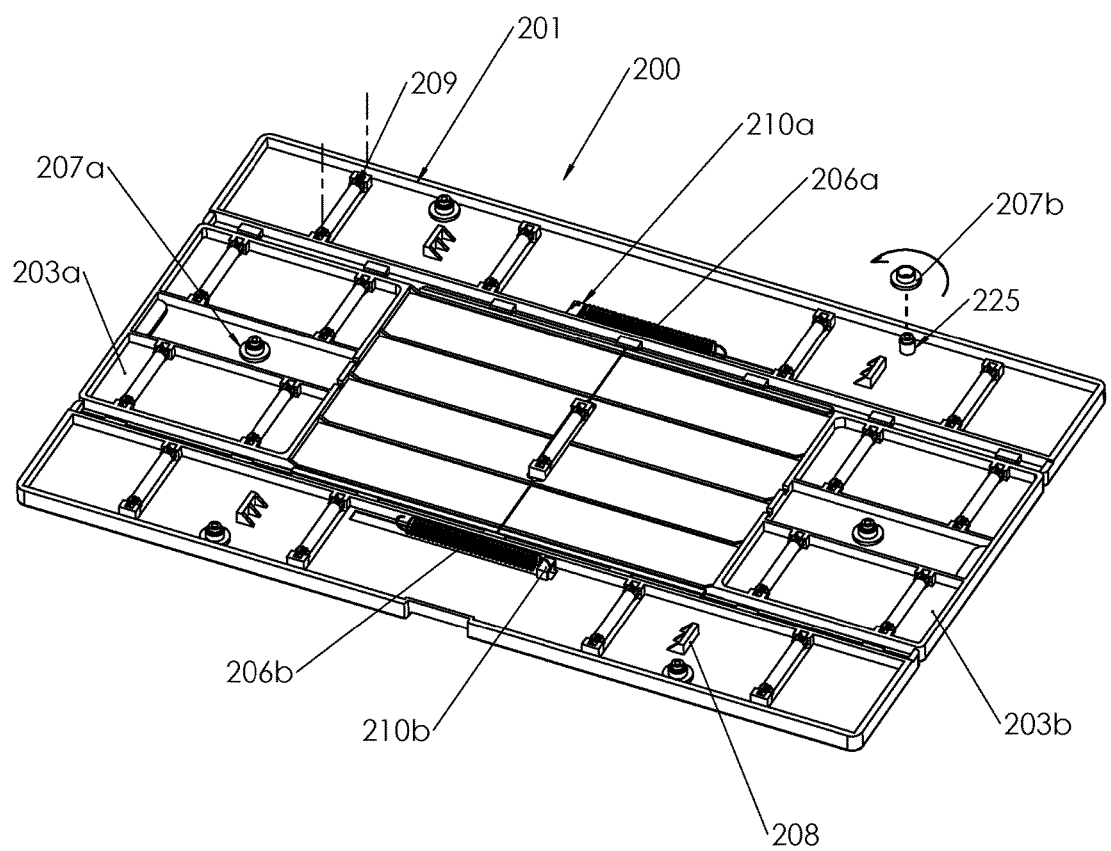
FIG. 11 depicts an interior perspective view of a top housing assembly.

FIG. 11 depicts a perspective view of the inside of a top housing assembly 200. Platform top housing 201 is shown as well as mouse pad top housings 203a and 203b of extendable mouse pads 101. The mouse pad top housings 203 are slide-ably mounted in the top housing 201. Rollers 202 are mounted in roller support journals 209 in the top housing and in the mouse pad top housings. Lateral guide bearings 207 are shown and these provide low friction guidance in the fore and aft directions between the top housing assembly 200 and the bottom housing assembly 300. The springs 206a and 206b are shown with each end anchored respectively at anchor points 210a and 210b on the top housing 201.

Figure 12:
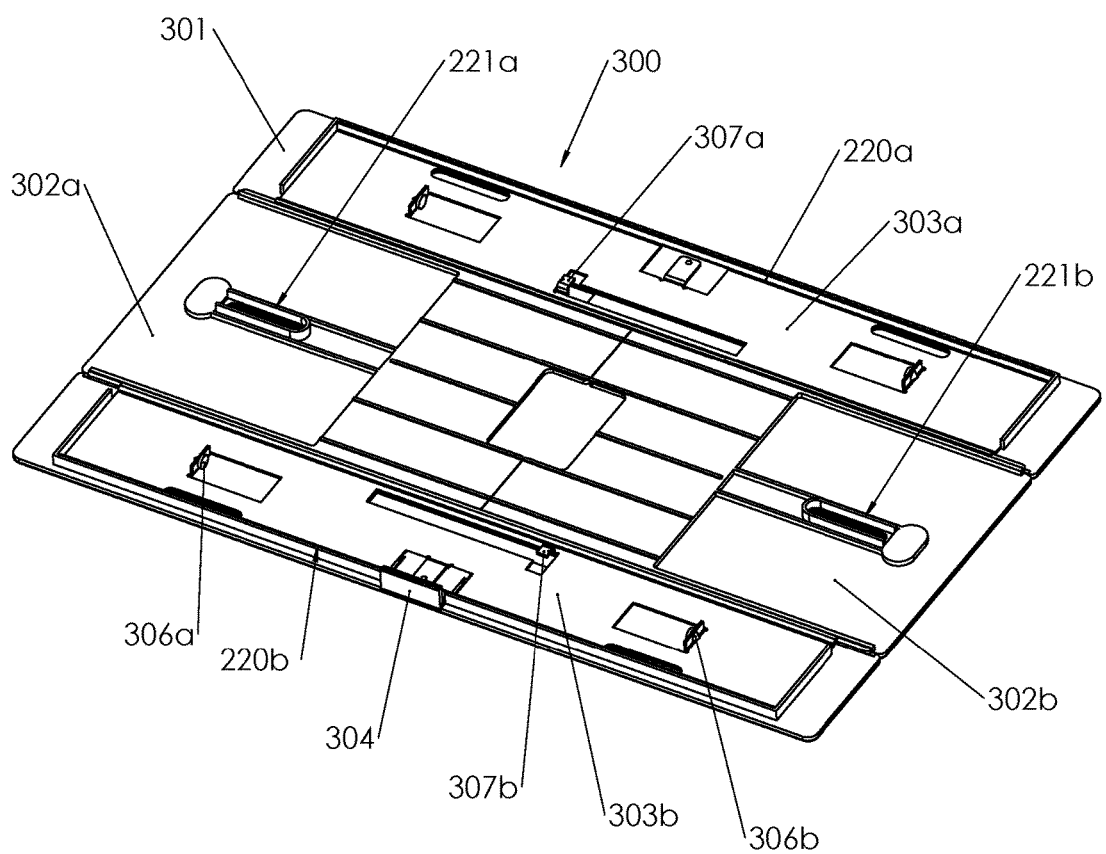
FIG. 12 depicts an interior perspective view of a bottom housing assembly.

FIG. 12 depicts an inside perspective view of a bottom housing assembly 300. Platform bottom housing 301 is shown as well as mouse pad bottom housings 302a and 302b of extendable the mouse pads. The mouse pad bottom housings 302a and 302b are slide-ably mounted in the bottom housing 301. Bumpers 306(a-b) are shown as well as locking latch 304. Stiffener plates 303a and 303b provide stiffness to the bottom housing assembly as well as capture and mounting features for the mouse pad housings 302a and 302b, locking latch 304, bumpers 306 and spring 206 anchor points 307a and 307b.

Figure 13:
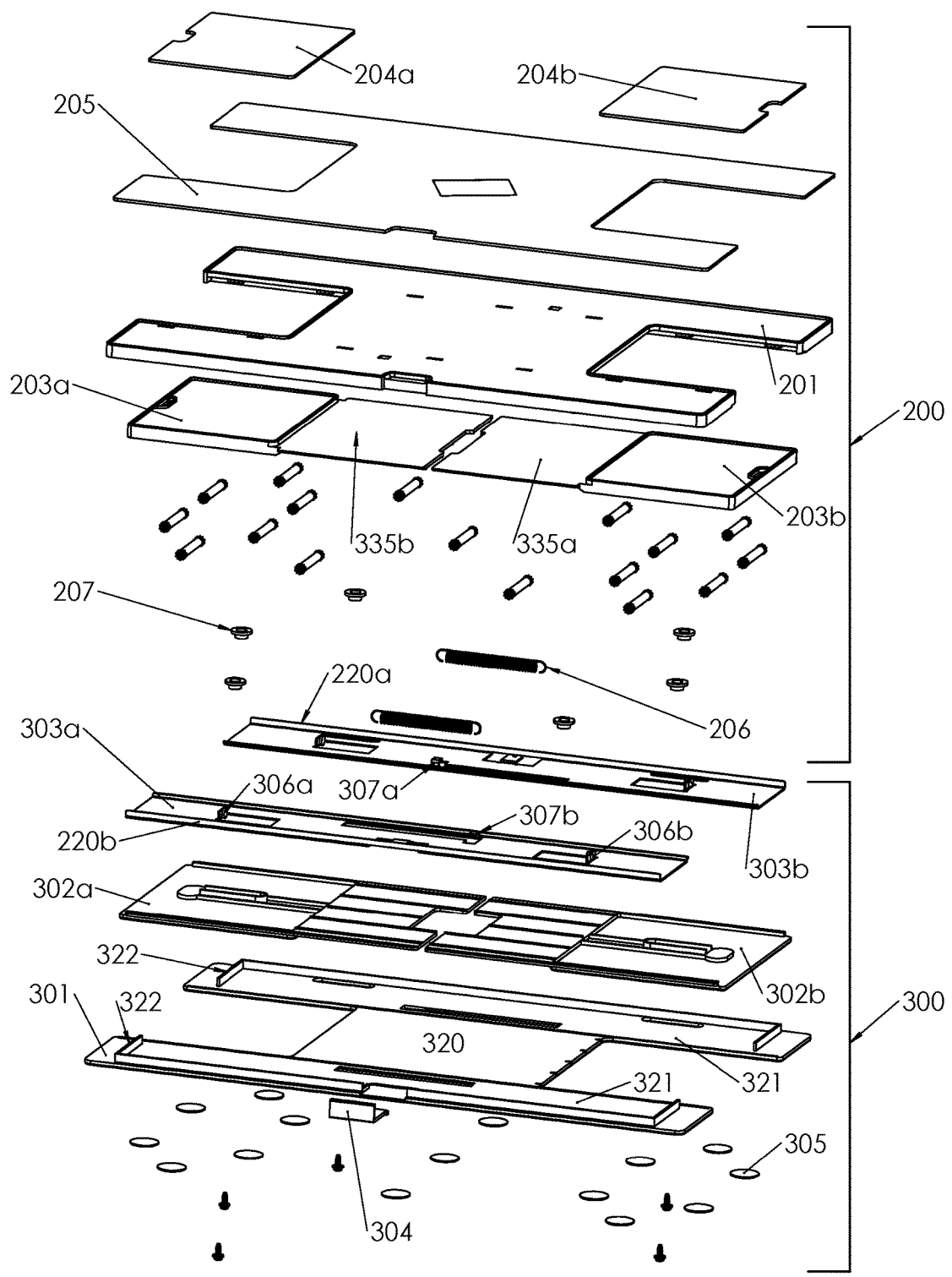
FIG. 13 depicts an exploded view of all of a preferred embodiment of assembly components.

FIG. 13 depicts an exploded view of all of the components of a preferred embodiment. The additional components shown in this view are the platform anti-slip pad 205 and the mouse pad anti-slip pads 204a and 204b. These elastomeric pads provide a high friction "sticky" surface for facilitating a secure no-slide surface for laptops, tablet computers and mobile phones.

FIG. 13 further depicts a plurality of foot pads 305 for attachment to a platform bottom housing 301. A platform bottom housing may comprise a center plan section 320, having a flat planer surface and attached to two rail plane sections 321. Each rail plane section 321 may comprise an outer stiffener 322. Stiffener plates 303(a-b) may retain and guide the mouse pad bottom housings. Each stiffener plate may comprise stop bumpers 306(a-b) and spring anchors 307(a-b).

Springs 206 may have a first end that is attached to a spring anchor 307 of a stiffener plate or other bottom housing member. Lateral guide bearings 207 may be disposed within voids as shown such as lateral tracks 220 and mouse pad lateral tracks 221.

In general, a platform top housing 201 slides or moves along a platform bottom housing 301. The lateral movement between a platform top housing 201 and platform bottom housing 301 provides excellent results in stabilizing or retarding the perceived movement of devices placed upon the platform top housing 201. The lateral movement may be facilitated by use of a variety of systems, including the use of rollers rotating between the platform top housing 201 and platform bottom housing 301. On the top housing portion of FIG. 13 a plurality of rollers 202 may be attached within or upon mouse pad top housings 203(a-b) to roll upon, on or near mouse pad bottom housing 302. The mouse pad top housings 203 may be retained and slide within the platform top housing 201. An optional platform anti-slip pad 205 may be fastened to a top surface of the platform top housing. Optional mouse pad anti-slip pads 204(1-b) may be fastened to the top of each mouse pad.

Figure 14:
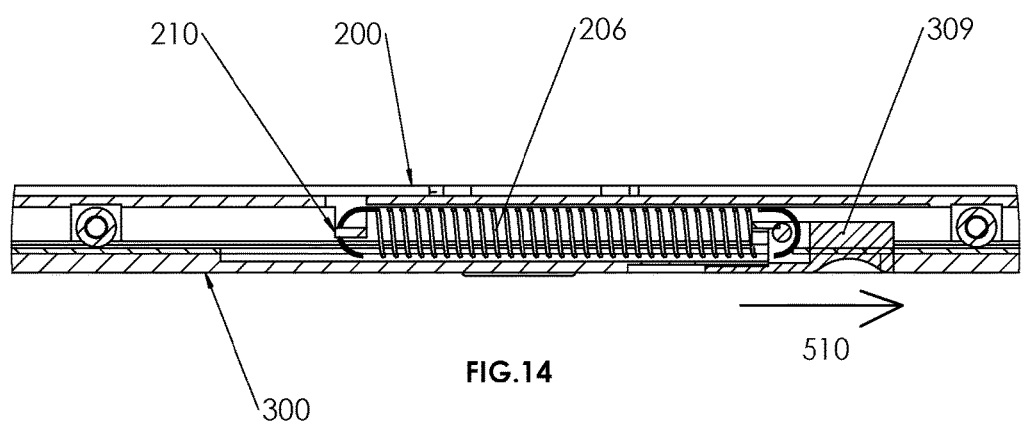
FIG. 14 depicts a front cross sectional view of a platform showing one of the adjustable spring anchors in the right or extended position.

FIG. 14 depicts a front a cross sectional view of an alternative embodiment where spring 206 anchor point 307 in platform bottom housing assembly 300 is replaced by adjustable spring anchor 309. The adjustable spring anchor is user accessible and allows for adjusting and setting the stabilizing spring 206 tension for light weight computers, such as tablet computers, or heavier computers such as laptop computers. This view shows the adjustable spring anchor moved to the right and for use with heavier weight computers. Directional arrow 510 depicts spring movement or spring adjustment to the right to increase spring tension.

Figure 15:
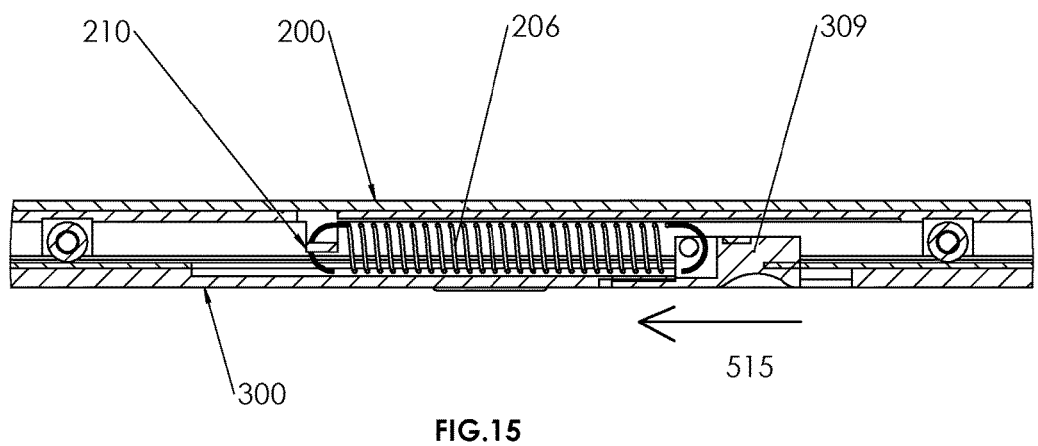
FIG. 15 depicts a front cross sectional view of a platform showing one of the adjustable spring anchors in the left or shortened position.

FIG. 15 depicts the adjustable spring anchor moved to the left and for use with lighter weight computers. Directional arrow 515 depicts spring movement or spring adjustment to the left to decrease spring tension.

Figure 16:
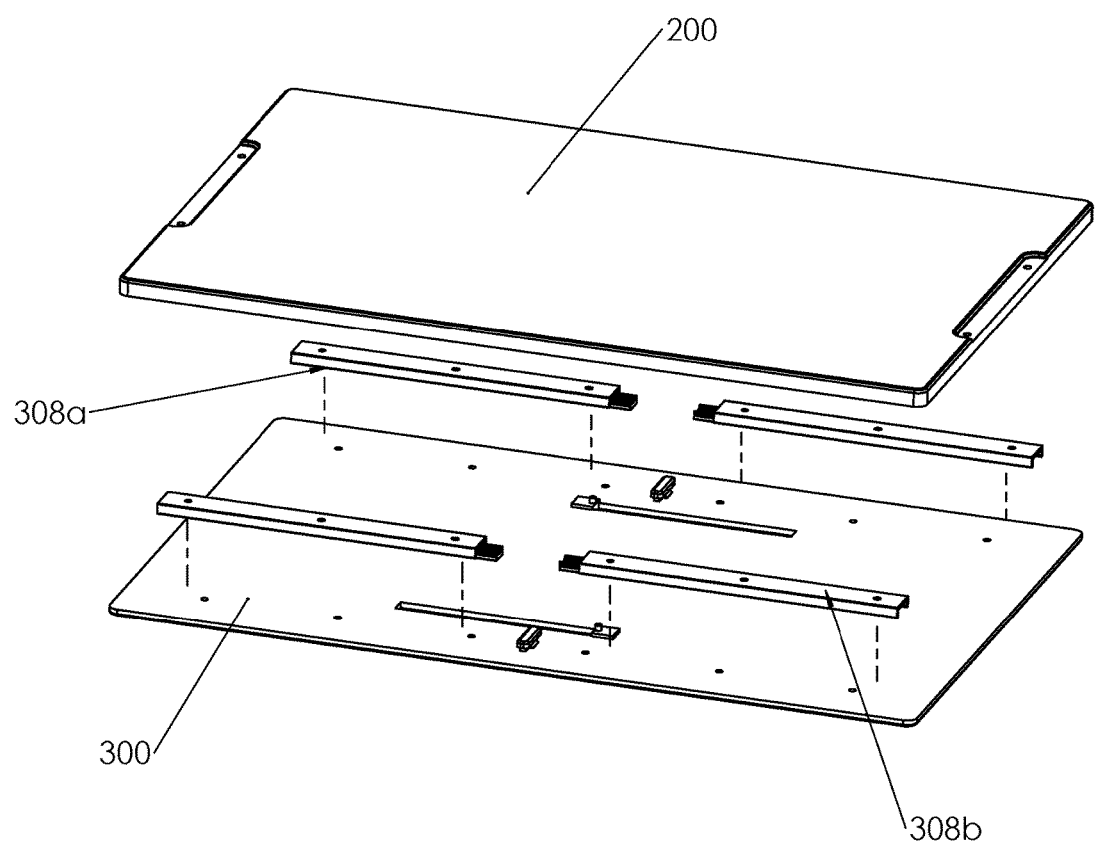
FIG. 16 depicts an exploded top perspective view of an alternate embodiment of the platform showing ball bearing slides in place of rollers.

FIG. 16 depicts an exploded view of an alternative embodiment where rollers 207 are replaced by commercially available ball bearing slides 308. Alternatively, rollers 207 can also be replaced by radial ball bearings or other low friction rolling or sliding components.

Figure 17:
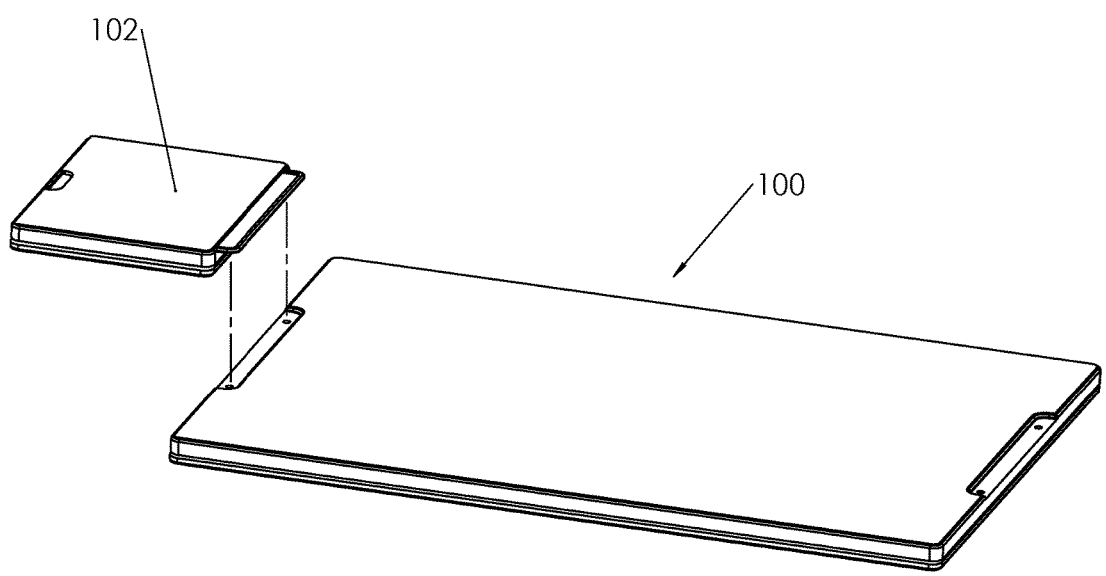
FIG. 17 depicts a top perspective view of an alternate embodiment platform without integrated, extendable mouse pads and a separate attachable mouse pad.

FIG. 17 depicts an alternative embodiment where the platform 100 does not have integrated extendable mouse pads. This view also shows another embodiment option where a detachable mouse pad 102 can be added as an accessory to the platform 100.

Figure 18:
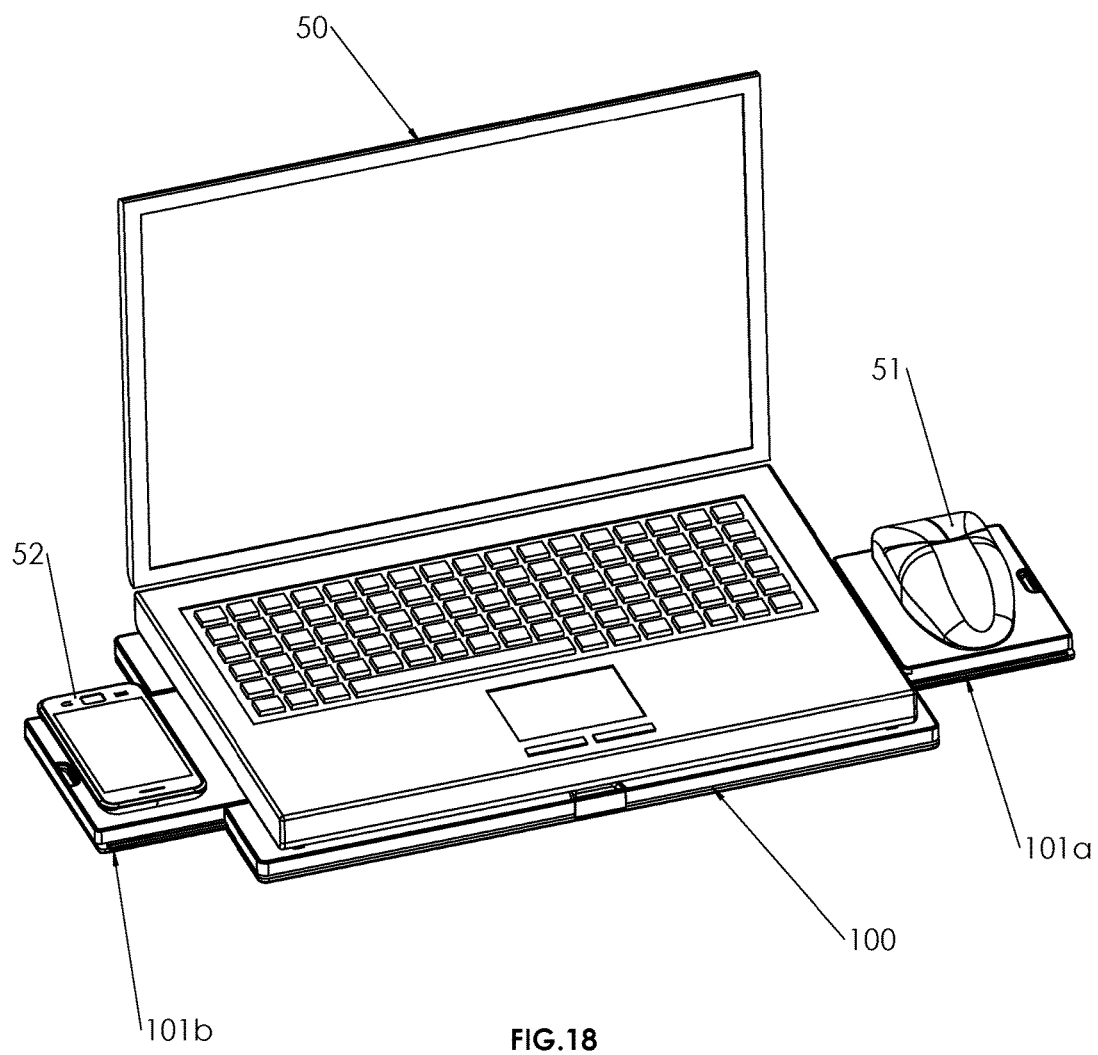
FIG. 18 depicts a top perspective view of a platform with a laptop resting on the platform and the right mouse pad extended with a mouse resting on the top surface and the left mouse pad extended with a mobile phone resting on the top surface.

FIG. 18 depicts a perspective view of a platform 100 with a laptop 50 sitting upon the top surface of the platform and wherein both mouse pads 101a and 101b are extended. The right mouse pad has a computer mouse 51 sitting on the top surface and the left mouse is being used as a stable, non-slip mounting surface for a mobile phone 52.

Figure 19:
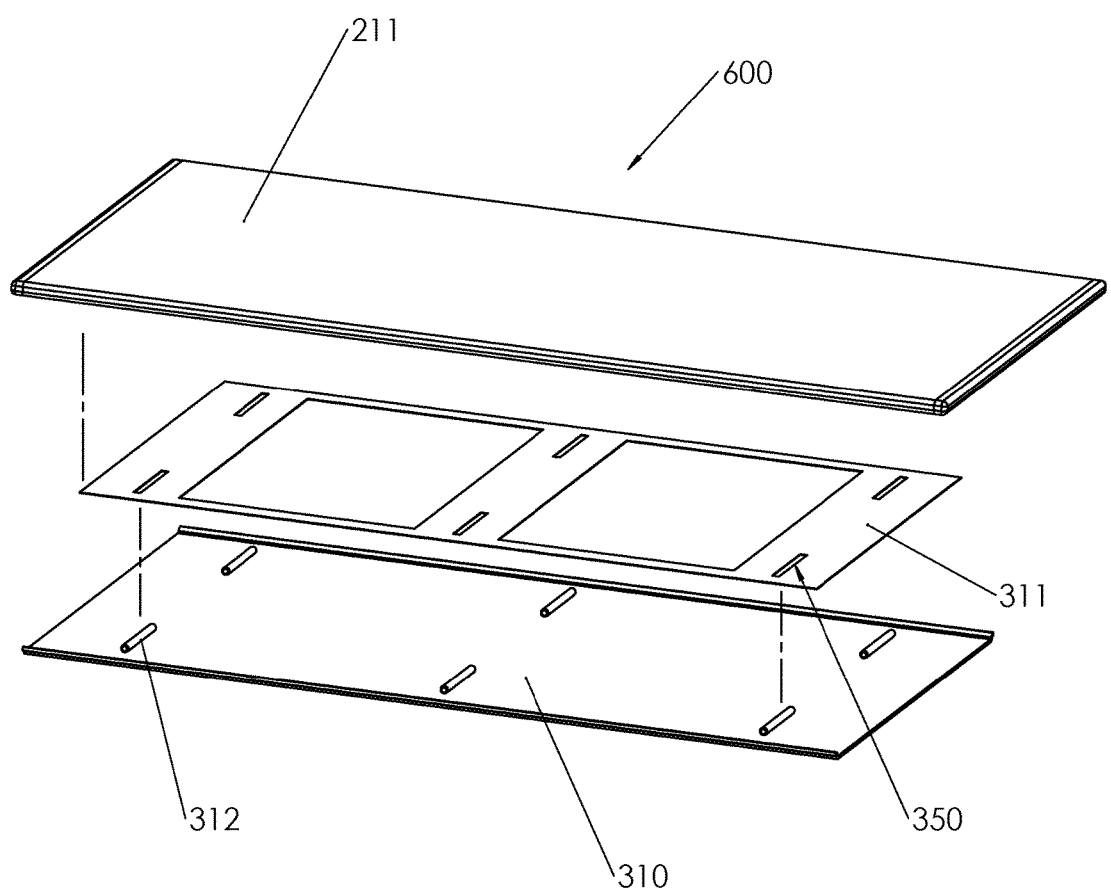
FIG. 19 depicts an exploded top perspective view of an alternative embodiment platform.

FIG. 19 is an exploded view of an alternative embodiment where rollers, which are mounted in roller journals, are replaced by free rollers 312 which are in direct rolling contact with the underside of top housing 211 and the top side of bottom housing 310. Free rollers 312 are guided and separated by guide plate 311. Guide plate 311 acts in the same way that a cage does in a radial ball bearing which guides and separates the balls between the inner and outer races.

Figure 20:
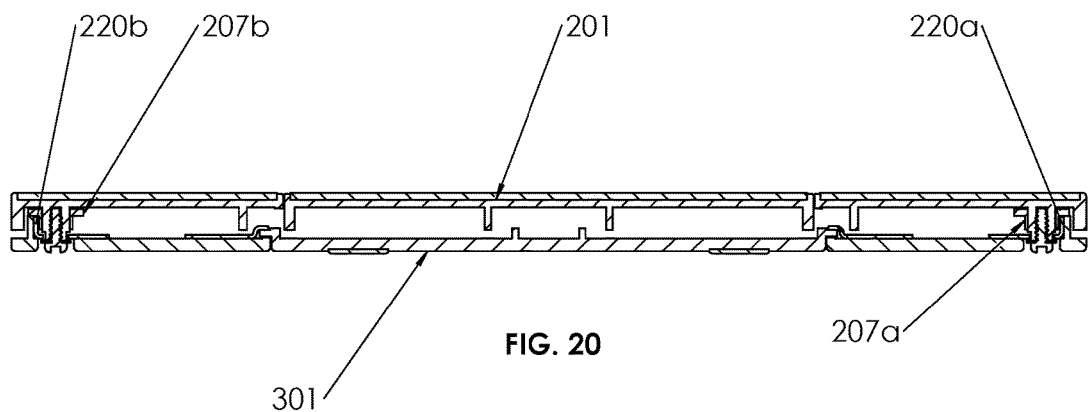
FIG. 20 is a cross section from FIG. 10.

FIG. 20 depicts a sectional view of a lateral guide bearing 207(a-b) contained within a lateral track 220(a-b).

Figure 21:
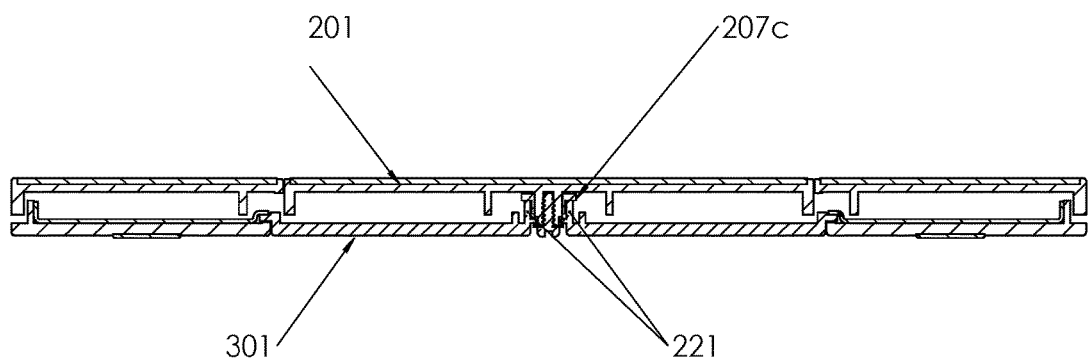
FIG. 21 is a cross section from FIG. 10.

FIG. 21 depicts a sectional view of a lateral guide bearing 207c contained within a mouse pad lateral track 221.

Figure 22:
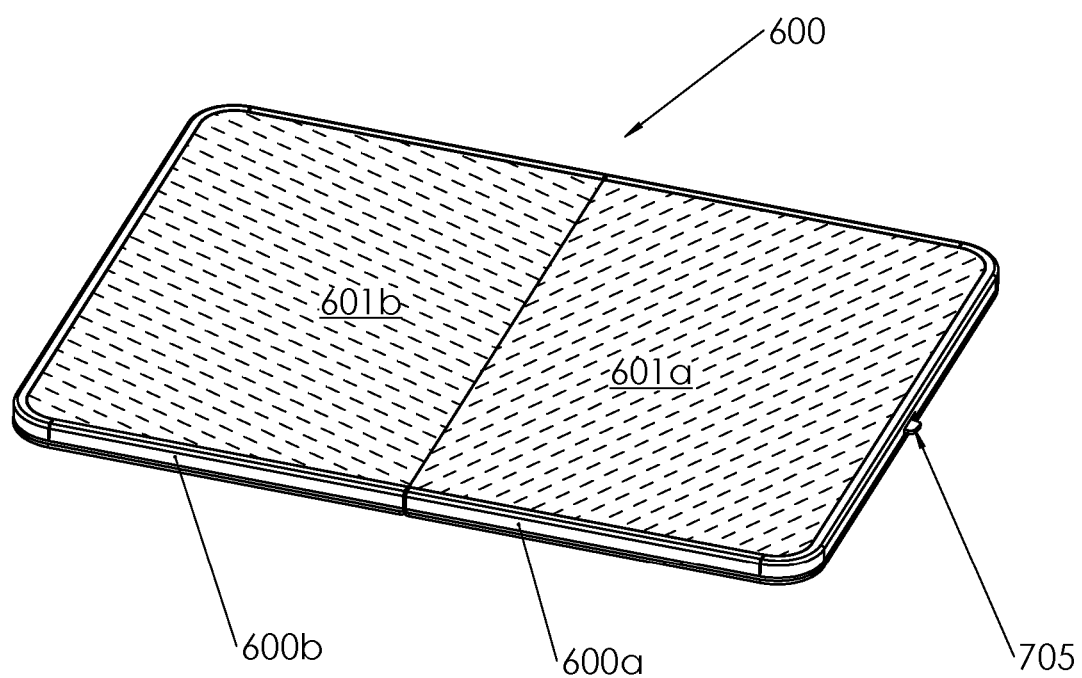
FIG. 22 depicts a top view of an expandable platform—retracted

FIG. 22 depicts an expandable platform 600 for mounting or supporting a laptop computer, tablet computer or other device. The platform is comprised of a right side, 600a and a left side, 600b which may be identical or mirror images of one another. The platforms 600a and 600b are expandable and retractable from each other. In the retracted configuration the platform 600 is compact and easily stowed in a backpack for transport. Also depicted is a slide locking latch 705. An expandable platform 600 may comprise top surfaces 601a and 601b used to support a laptop computer, tablet computer or other device.

Figure 23:
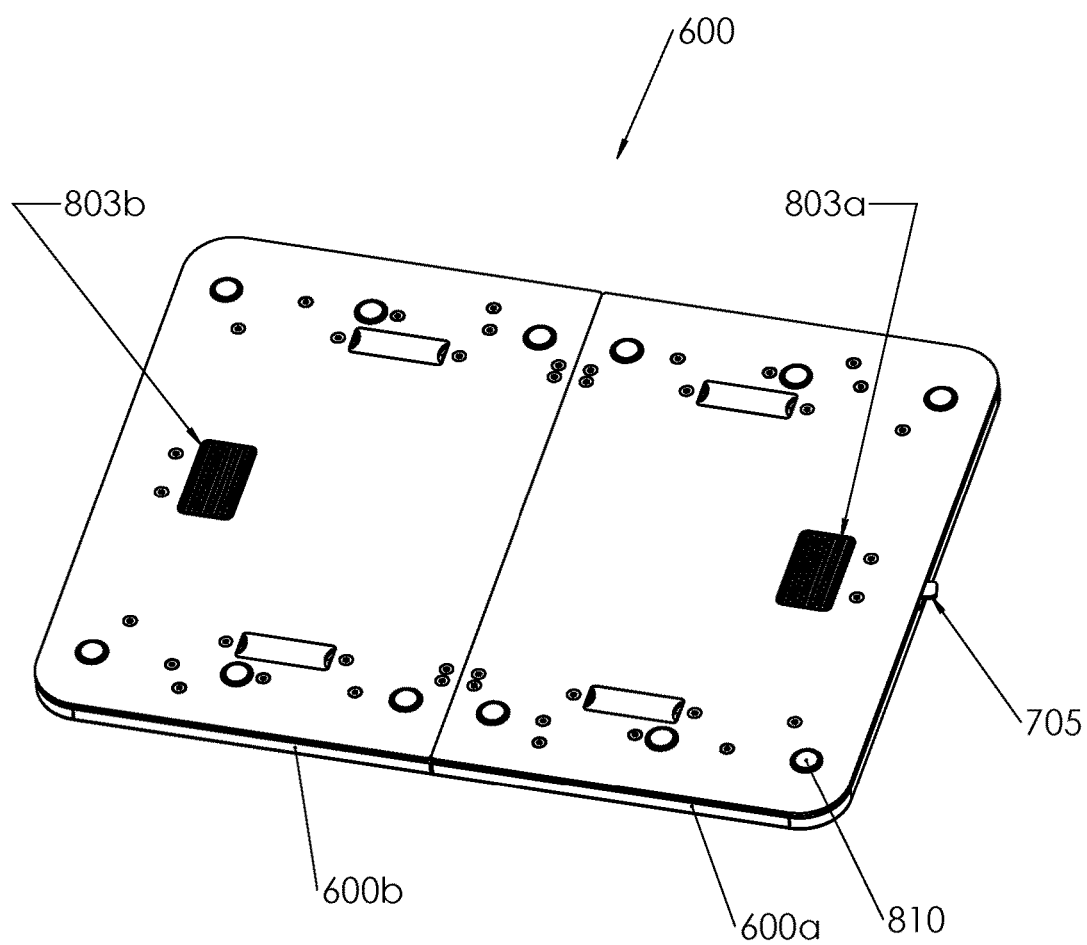
FIG. 23 depicts a bottom view of an expandable platform—retracted

FIG. 23 depicts a bottom view of an expandable platform 600 and shows extension plate latches 803a and 803b, top housing slide lock latch 705 and foot pads 810.

Figure 24:
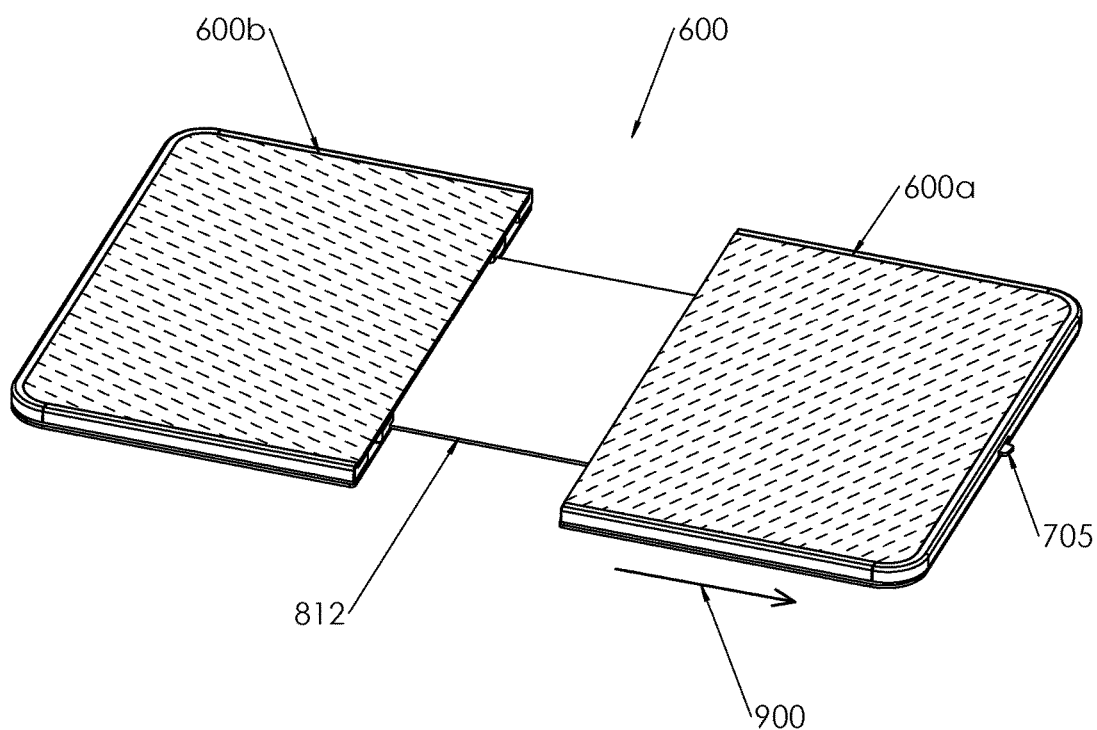
FIG. 24 depicts a top view of an expandable platform—expanded open half way

FIG. 24 depicts the platform 600 and the right side 600a pulled out to the right. Extension plate latch 803a (shown in FIG. 23) has been pressed upwards to release platform 600a from the extension plate 812. Also depicted is extension plate 812 which joins and slideably guides platforms 600a and 600b. This configuration of the platform accommodates larger laptop computers and no mouse pad surface.

Figure 25:
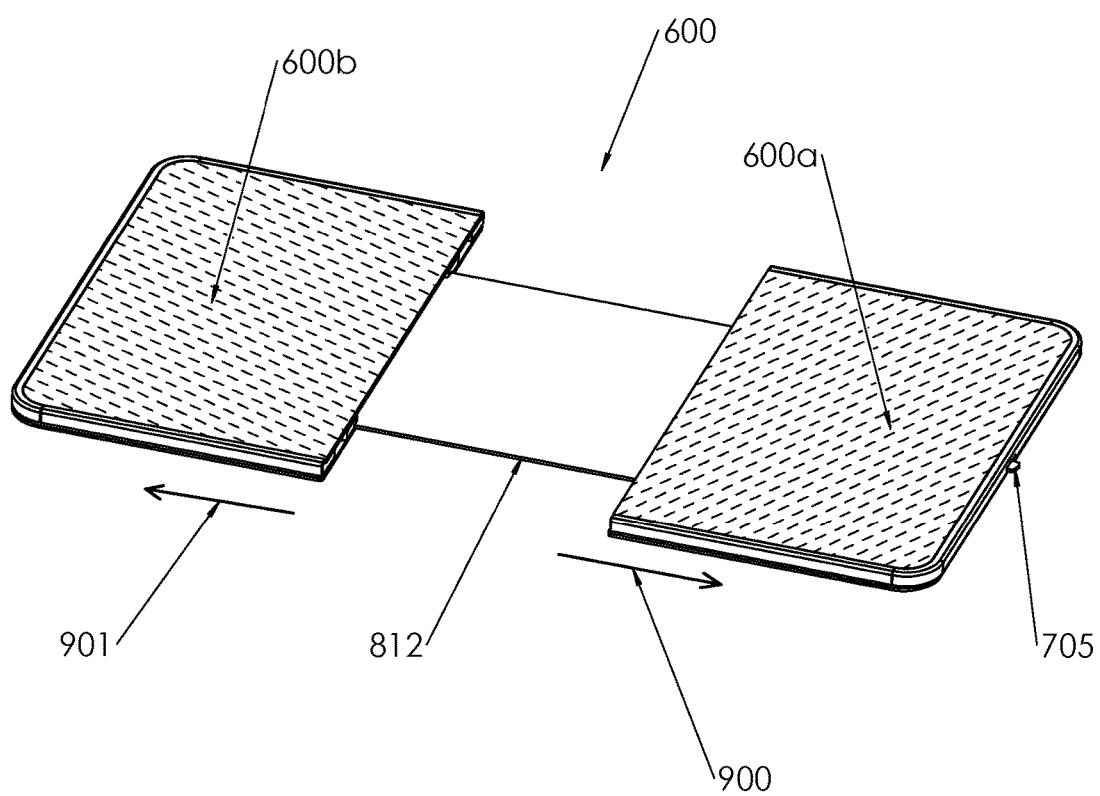
FIG. 25 depicts a top view of an expandable platform—expanded open fully

FIG. 25 depicts the platform 600 of FIG. 24 with the left side 600b pulled out to the left. Extension plate latch 803b (shown in FIG. 23) has been pressed upwards to release platform 600b from the extension plate 812. Also depicted is extension plate 812 with joins and slideably guides platforms 600a and 600b. This configuration of the platform accommodates small or large laptop computers plus a mouse pad surface.

Figure 26:
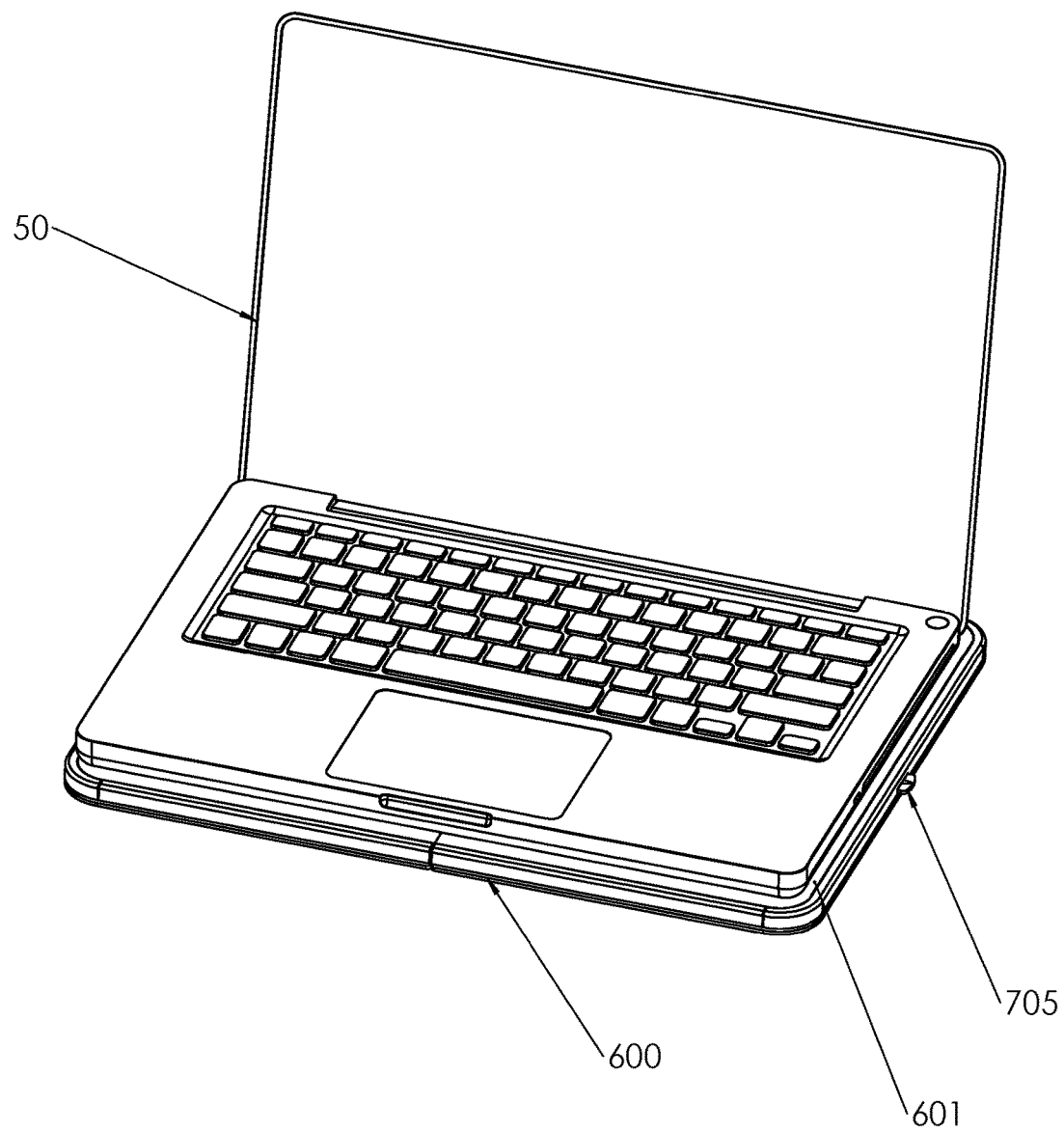
FIG. 26 depicts a top perspective view of a laptop resting upon an expandable platform—retracted

FIG. 26 depicts a platform 600 in a retracted configuration with a small laptop 50 resting on the top surface 601 of the platform.

Figure 27:
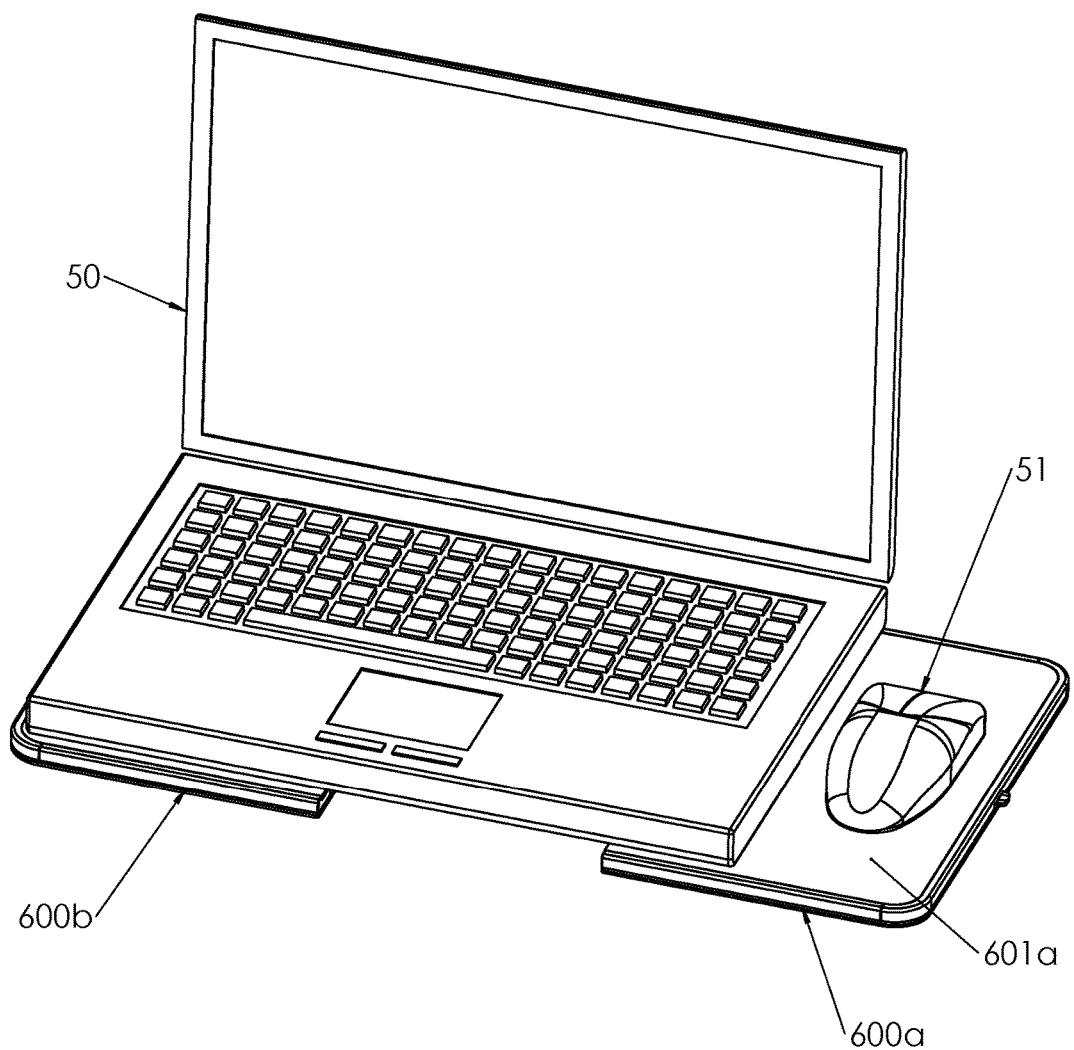
FIG. 27 depicts a top perspective view of a laptop and computer mouse resting upon an expandable platform—expanded

FIG. 27 depicts a platform 600 in the fully expanded configuration with a large laptop 50 and computer mouse 51 resting on the top surface 601 of the platform.

Figure 28:
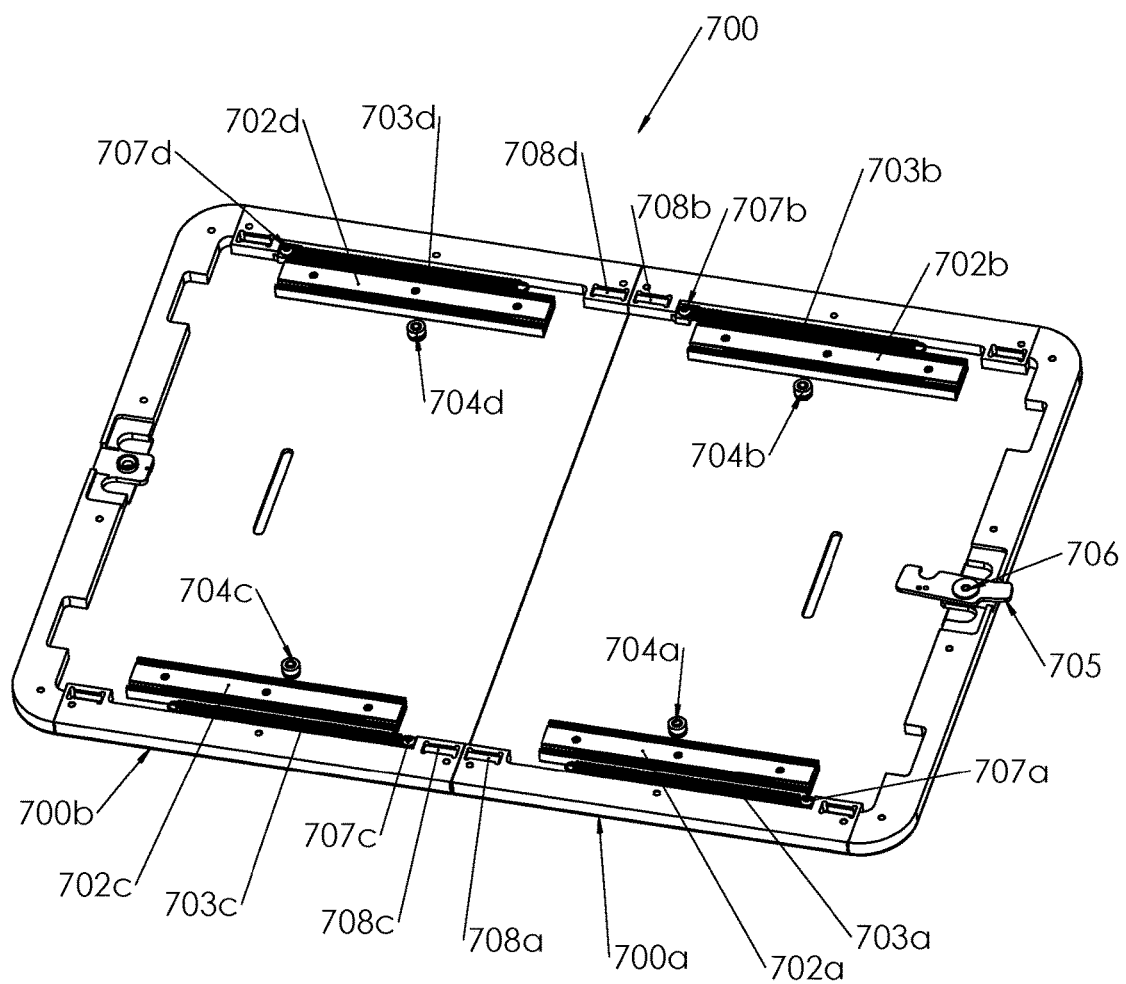
FIG. 28 depicts an interior perspective view of a split top housing assembly.

FIG. 28 depicts a perspective view of the inside of a top housing assembly 700 sometimes used as part of expandable platform 600. Platform top housings 700a and 700b are also depicted. A plurality of ball bearing slides 702(a-d) are shown and may provide low friction guidance in the left and right directions between the top housing assembly 700 and the bottom housing assembly 800 (shown in FIG. 29). The springs 703(a-d) are shown with one end anchored respectively at anchor points 707(a-d) on the top housing 800. Also shown are top housing hard stop posts 704(a-d). Hard stop posts 704(1-d) may provide a left to right end of travel stop for the top housing when the post comes in contact with the top housing end of travel surfaces 808 and 809 on the bottom housings 800a and 808b. The top housing slide lock latch 705 is shown. The latch locks the top housing assembly 600 to the bottom housing assembly 800. This feature is useful for stowing and carrying the platform and for momentarily turning off the anti-vibration feature while the laptop or tablet are not in use in the vehicle. The lock latch pivot 706 is also shown. Magnets 708 are depicted and may be used to keep top housings 700a and 700b in contact and in motion simultaneously when the platform 600 is in the retracted configuration.

Figure 29:
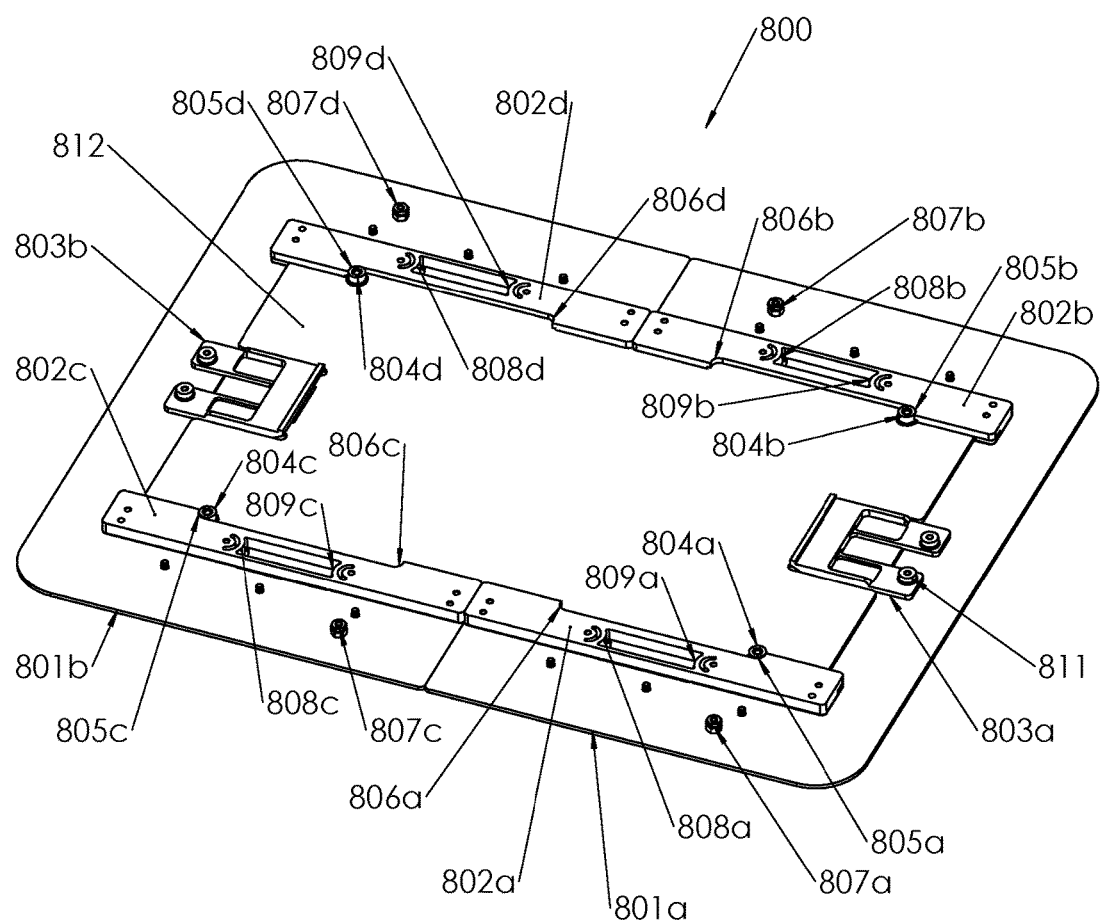
FIG. 29 depicts an interior perspective view of a split bottom housing assembly.

FIG. 29 depicts a perspective view of the inside of a bottom housing assembly 800. Platform bottom housings 800a and 800b are also depicted. Extension plate 812 is shown and extension plate guides 802(a-d). The extension plate guides 802(a-d) capture and slideably guide the extension plate as the extension plate is extended and retracted in and out of bottom housings 801a and 801b. The bottom housing springs anchor points 807(a-d) are shown. Also shown are the top plate end of travel surfaces 808(a-d) and 809(a-d). Extension plate hard stop posts 804(a-d) are shown and these post provide extension and retraction hard stops for the extension plate 812 as the posts come in contact with extension plate end of travel stop surfaces 805 and 806. The extension plate latches 803a and 803b are shown. The latches are anchored on bottom plate assemblies 801a and 801b. The latches lock on each end of the extension plate 812 when the bottom plate assemblies 800a and 800b are retracted. Pressing upwards on latches 801a and 801b releases bottom housing assemblies 801a and 801b from the extension plate and allows the housing assemblies to move outwardly.

Figure 30:
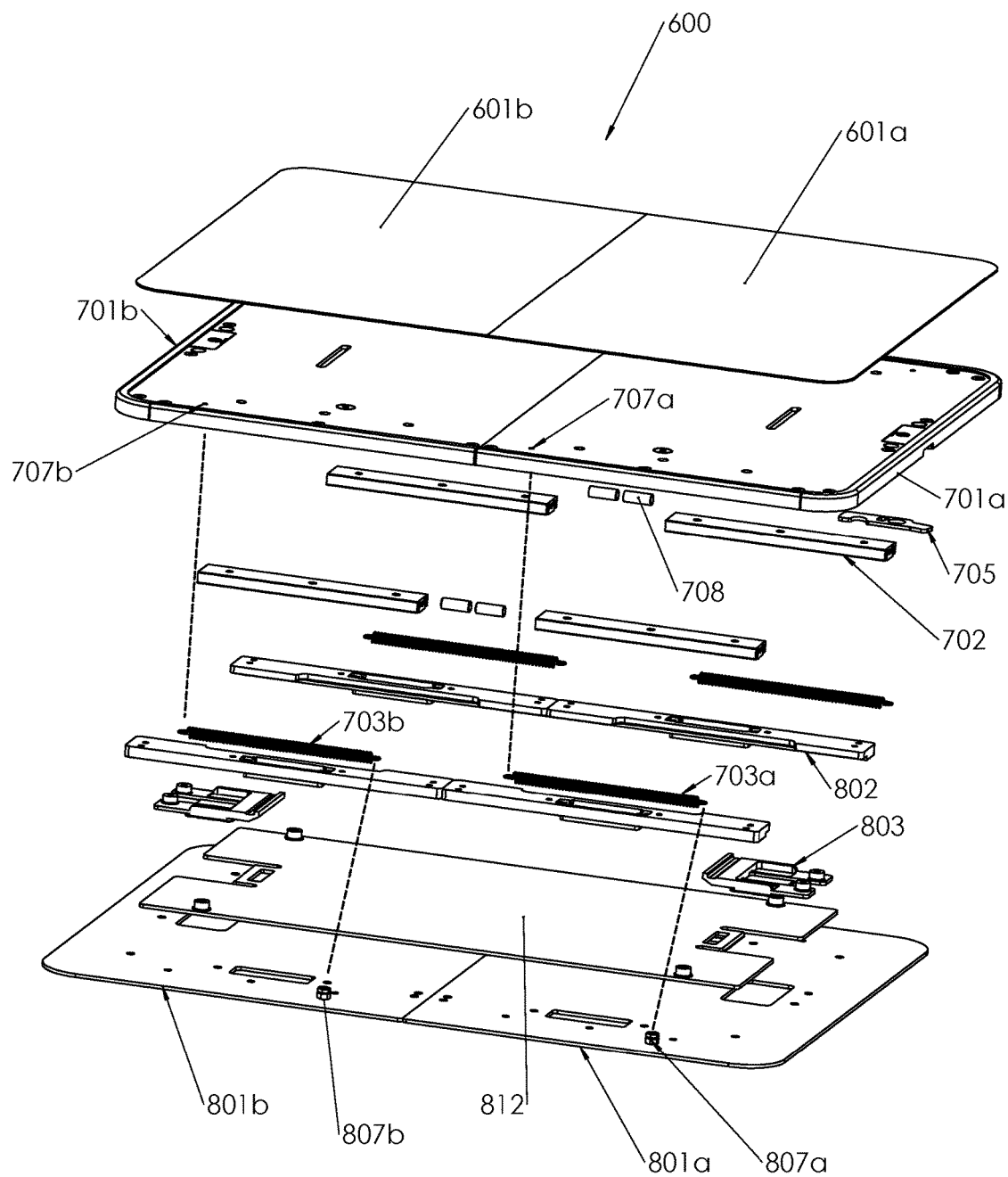
FIG. 30 depicts an exploded view of a preferred embodiment of assembly components.

FIG. 30 depicts an exploded view of the components of an expanded platform 600, a preferred embodiment.

Figure 31:
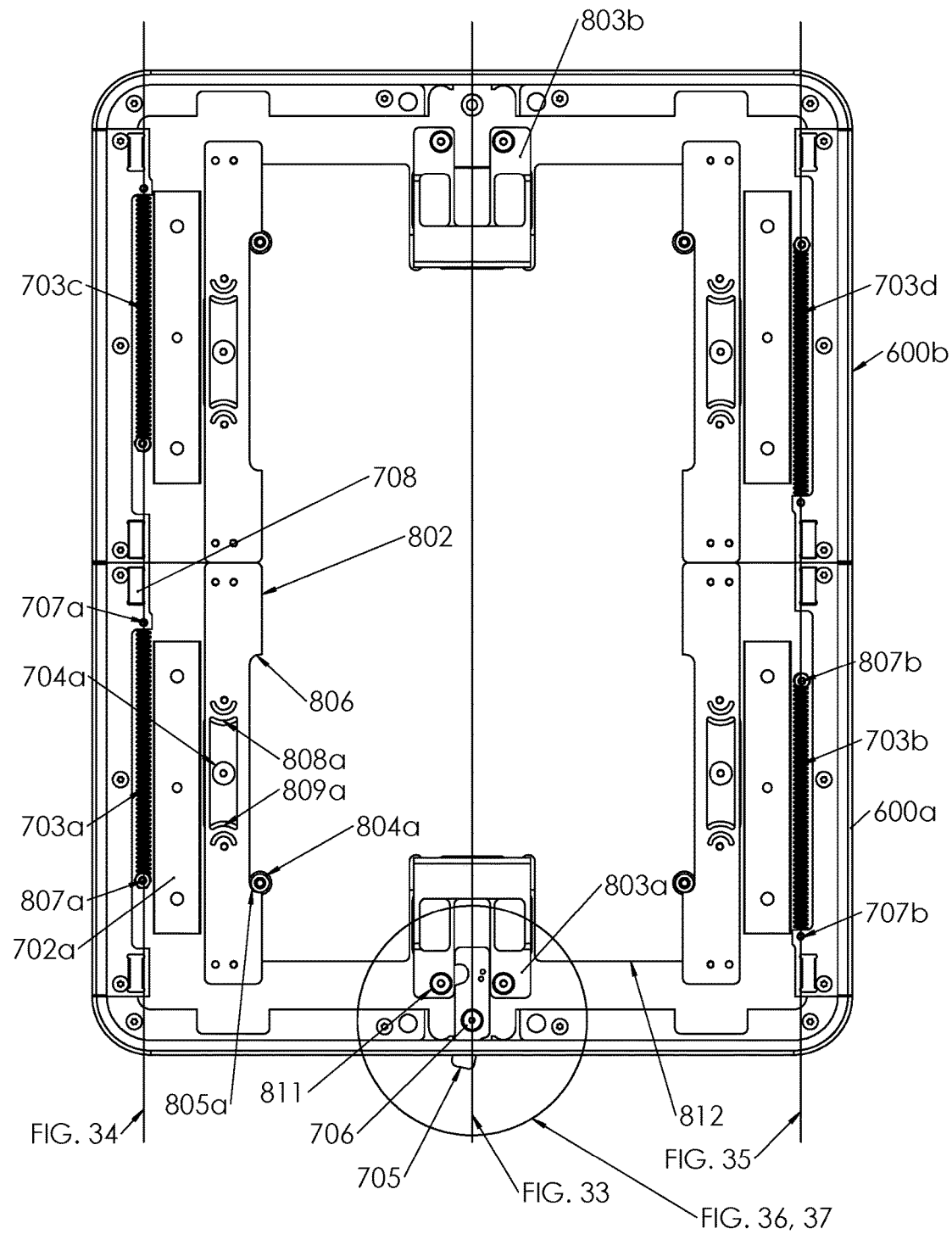
FIG. 31 depicts a top cross sectional view showing ball bearing slides, springs, guides, hard stop posts and latches—retracted

FIG. 31 depicts a top cross sectional view of a platform 600 in a retracted configuration. This view shows ball bearing slides 702. This view also shows stabilizing springs 703a and 703b being anchored to the top housing assembly 700a of assembly 600a at one end 707a and 707b and to the bottom housing assembly 800a of assembly 600a at the other end 807a and 807b. The springs 703a and 703b provide opposing forces and are used for stabilizing the top housing assemblies 700a and 700b, and thus laptop or tablet, in a steady position relative to earth and the user as the bottom housing assemblies 800a and 800b, which are resting on the table mounted in a vehicle, is shaking or vibrating left to right. Expandable platforms 600a and 600b of expandable platform 600 are identical and stabilizing springs 703(a-d) provide independent and identical stabilization for expandable platforms 600a and 600b. Also shown are top housing hard stop posts 704 and top housing end of travel stop surfaces 808 and 809. The stop posts 704 provide for the end of travel of the top housing assembly to the left and right. The extension plate hard stop posts 804 are shown as well as the extension plate end of travel stop surfaces 805 and 806. The extension plate hard stop posts 804 are shown resting against extension plate end of travel stop surfaces 805. The extension plate latches 803a and 803b are shown as well as the top housing slide lock latch 705, lock latch pivot 706 and lock latch locking post 811.

Figure 32:
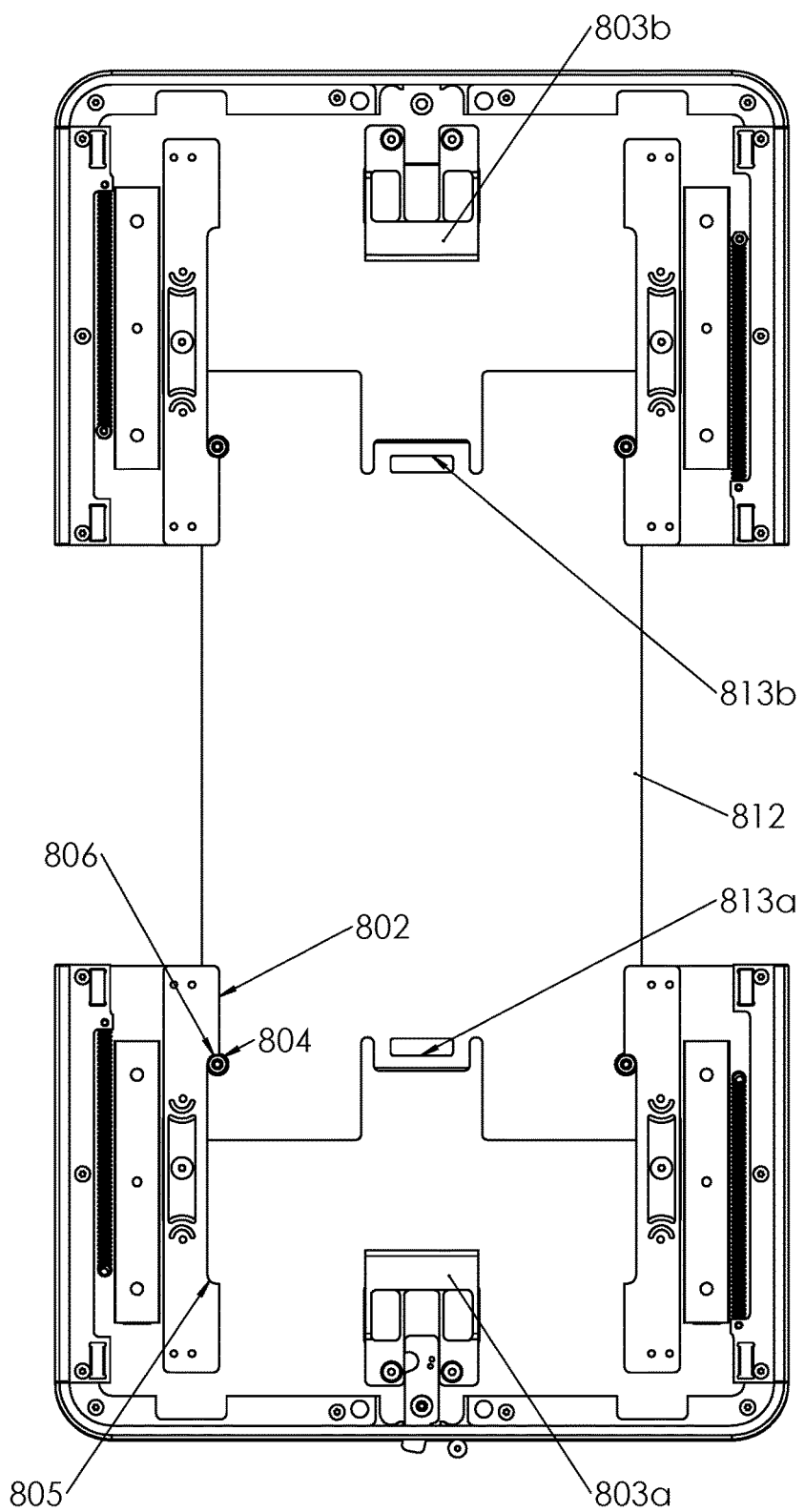
FIG. 32 depicts a top cross sectional view showing ball bearing slides, springs, guides, hard stop posts and latches—expanded

FIG. 32 depicts a top cross sectional view of a platform 600 in the expanded configuration. The extension plate 812 hard stop posts 804 are shown resting against extension plate end of travel stop surfaces 806. Also shown are extension plate latches 803a and 803b and extension plate latch locking surfaces 813a and 813b. Extension plate latches 803 lock onto surfaces 813 when each extendable platform 600a and 600b is in the retracted configuration relative to the extension plate 812. This latching will be further depicted and explained in FIG. 33.

Figure 33:
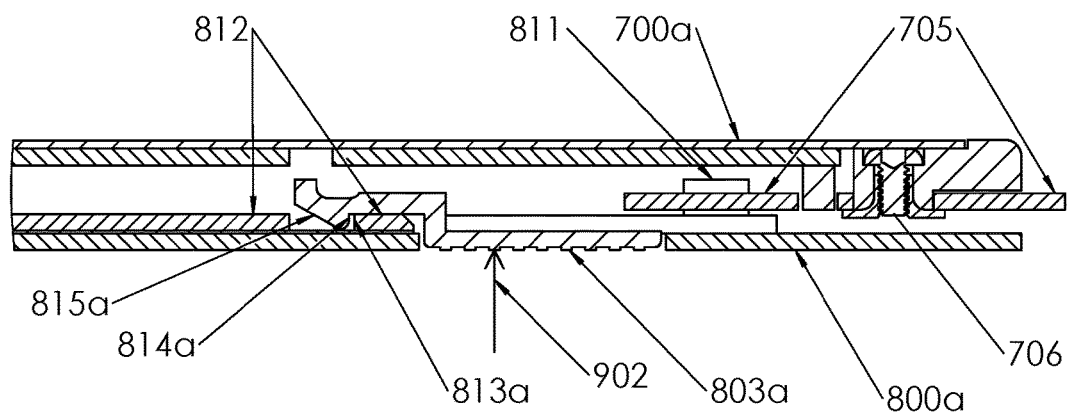
FIG. 33 depicts a front cross sectional view of a platform showing an extension plate and latch

FIG. 33 depicts a top cross sectional view of a platform 600a in the retracted configuration. Extension plate 812 and extension plate latch 803a is shown. Extension plate latch 803 is a flexure and is anchored at one end and has latch locking surface 814 with lead-in ramp 815 on the other end. The latch locking surface 814 locks against the extension plate latch locking surface 813 when the expandable platforms 600a and 600b are prospectively retracted. Pressing upwards on the extension plate latch 803 at arrow 902 releases the locking surfaces 813 and 814 allows expandable platforms 600a and 600b to move outwards. Also shown is top housing slide lock latch 705, lock latch pivot 706 and lock latch locking post 811.

Figure 34:
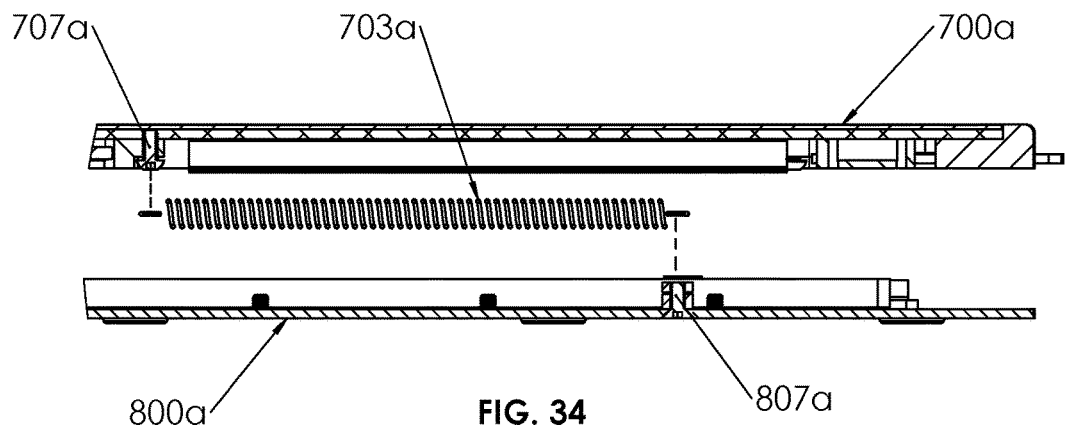
FIG. 34 depicts an exploded front cross sectional view of a platform showing one of the rear springs and its anchor points

FIG. 34 depicts an exploded front a cross sectional view of platform 600a. This view shows the left spring 703a and its prospective spring anchor points 707a on top housing assembly 700a and 807a on bottom housing assembly 800a.

Figure 35:
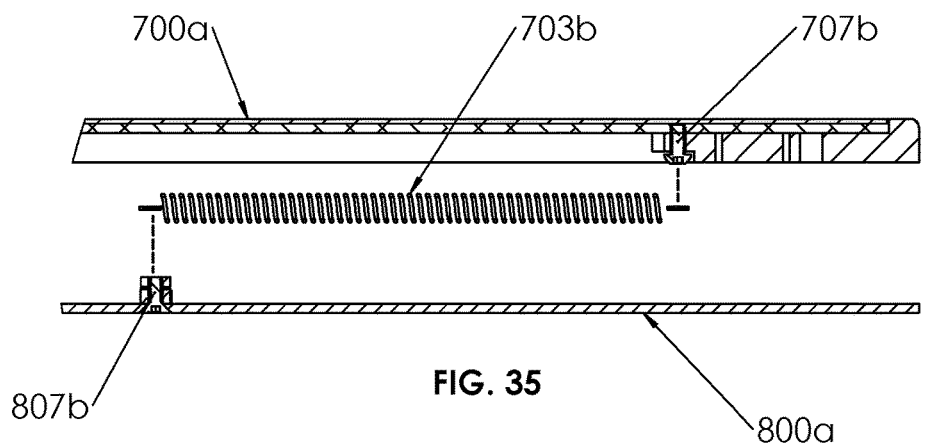
FIG. 35 depicts an exploded front cross sectional view of a platform showing one of the front springs and its anchor points

FIG. 35 depicts an exploded front a cross sectional view of platform 600a. This view shows the right spring 703b and its prospective spring anchor points 707b on top housing assembly 700a and 807b on bottom housing assembly 800a. The springs 703a and 703b provide opposing forces and are used for stabilizing the top housing assembly 700a, and thus laptop or tablet, in a steady position relative to earth and the user as the bottom housing assembly 800a. Expandable platforms 600a and 600b and their respective top and bottom housing assemblies are identical.

Figure 36:
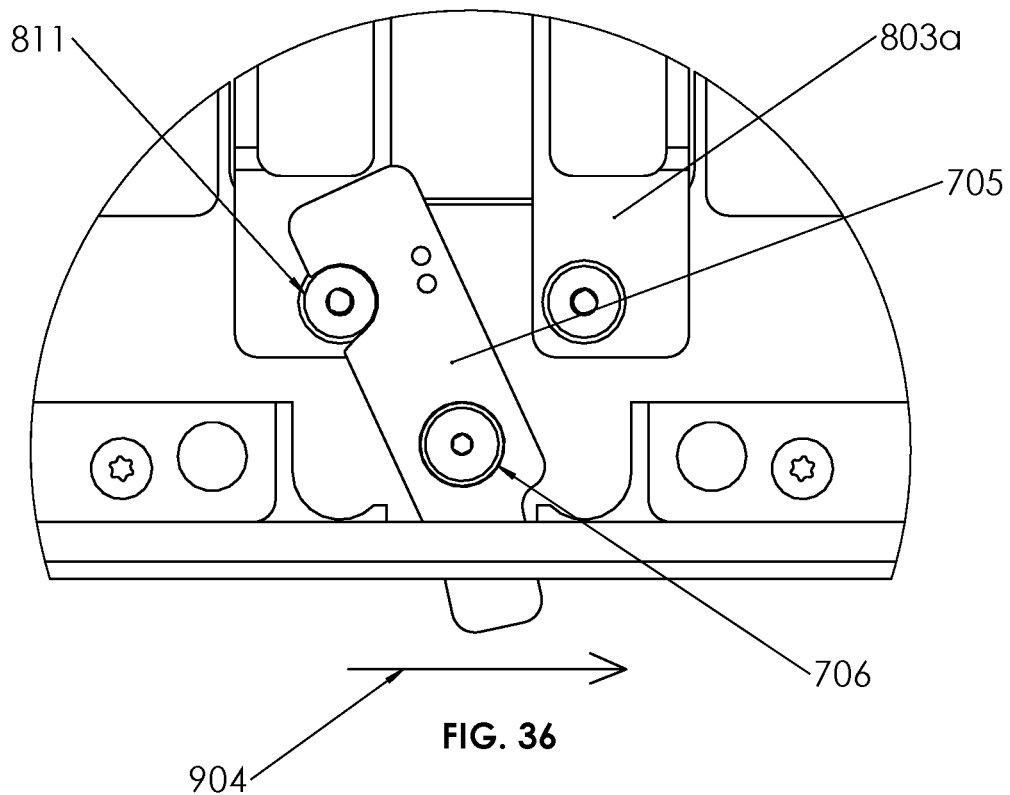
FIG. 36 depicts a top cross sectional view showing a slide lock latch in the unlocked position

FIG. 36 depicts a top cross sectional view of platform 600a. This view shows top housing locking latch 705 in the locked position relative to lock latch locking post 811. Also shown is lock latch pivot 706. The latch locks the top housing assembly 700a to the bottom housing assembly 800a. This feature is useful for stowing and carrying the platform and for momentarily turning off the anti-vibration feature while the laptop or tablet are not in use in the vehicle. Directional arrow 904 indicates that the locking latch tab has been moved to the right.

Figure 37:
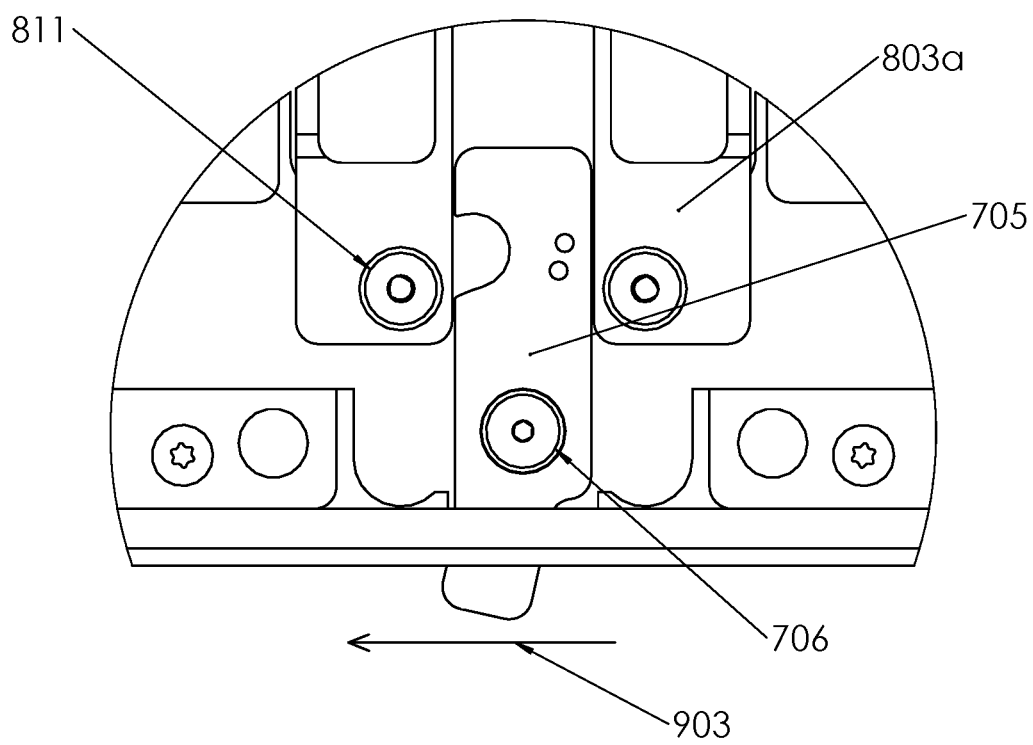
FIG. 37 depicts a top cross sectional view showing a slide lock latch in the locked position

FIG. 37 depicts a top cross sectional view of platform 600a. This view shows top housing locking latch 705 in the unlocked position relative to lock latch locking post 811. Also shown is lock latch pivot 706. This allows the top housing assembly 700a to laterally articulate relative to the bottom housing assembly 800a. Directional arrow 903 indicates that the locking latch tab has been moved to the left.

Figure 38:
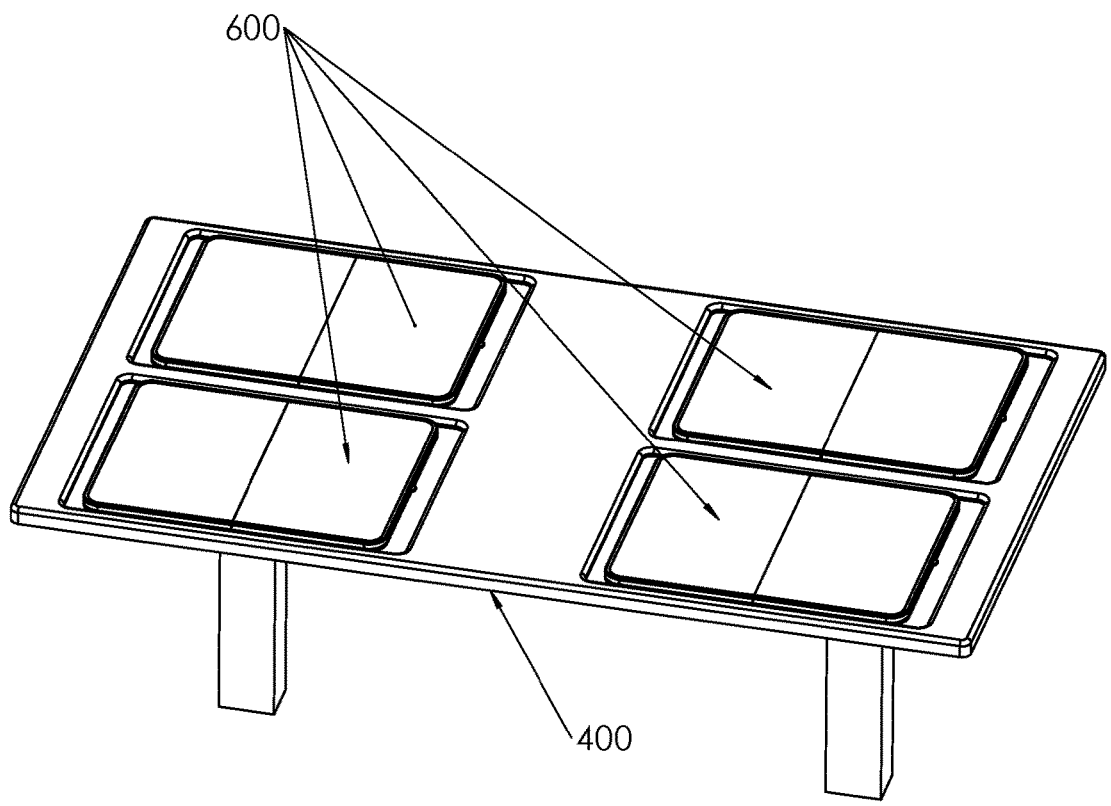
FIG. 38 depicts a top view of multiple expandable platforms mounted on and attached to a vehicle table

FIG. 38 depicts a plurality of expanded platforms 600 fixed to the top of a vehicle mounted table 400. Vehicle mounted table may be in a variety of vehicles such as a bus, train car, RV, aircraft or military vehicle.

Figure 39:
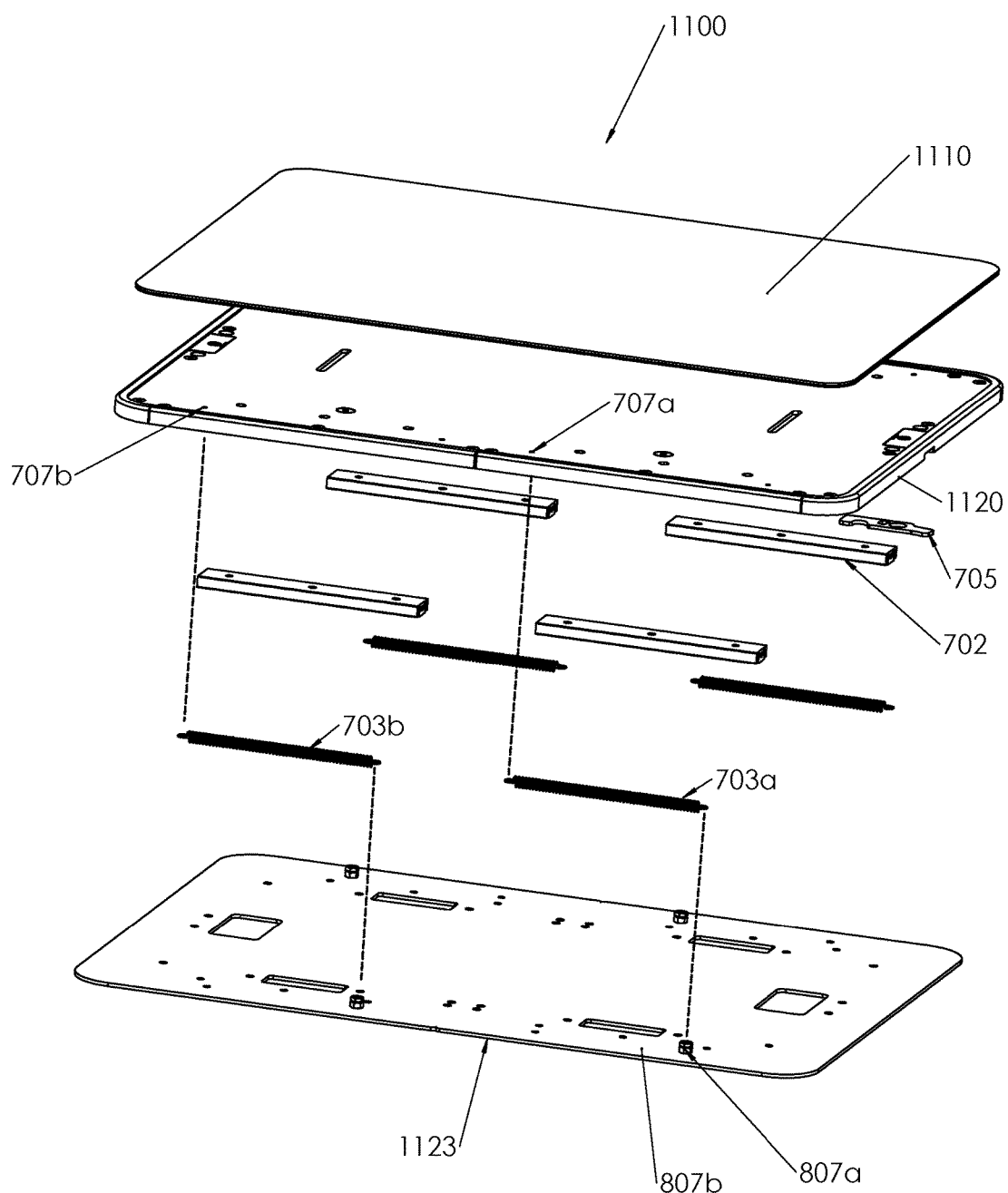
FIG. 39 depicts an exploded view of the components of a mono version embodiment of the platform having a single top housing and a single bottom housing

FIG. 39 depicts an exploded view of the components of a mono or monolithic version embodiment 1100 of a platform having a single top surface (1110) single top housing (1120) and a single bottom housing (1123). This embodiment may comprise a plurality of slides (702), a plurality of springs (703) and a latch (705). Each spring may have a first end attached to an anchor point 807 of the single bottom housing (1123) and each spring may have a second end attached to an anchor point 707 of the single top housing (1120). Each slide may have a top section attached to a bottom surface of the top housing and each slide may have a bottom section attached to an upper surface of the bottom housing (1123). In this configuration, shortfalls in the prior art are overcome as the slides and springs compensate or diminish the perceived differential movement of a laptop on the top surface with the environmental movement of the bottom housing.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Disclosed embodiments may take the form of the following items:

Item 1. A platform (600) for stabilizing a laptop or similar item used within a moving vehicle, the expandable platform comprising: a) a right side (600a) and a left side (600b) with the right side comprising a right hand top surface (601a) and the left side comprising a left hand top surface (601b) with an extension plate (812) slideably connected to the right side and left side;

b) a first top housing assembly (701a) attached to a bottom surface of right hand top surface (601a) and a second top housing assembly (701b) attached to a bottom surface of the left hand top surface (601b), the first and second top housing assemblies each comprising a first and second slide (702);

a spring (703) with the spring attached to a spring anchor point (707) the spring anchor point attached to the top housing and the spring attached to a spring anchor point 807 of a bottom housing 800;

the bottom housing comprising an extension plate guide (802), and an extension plate hard stop (804).

Item 2. The platform of 1 further comprising top housing magnets (708) attached to the top housing.

Item 3. The platform of 2 further comprising an extension plate latch (803) attached to attached to each side of the platform bottom housing and a top housing slide lock latch (705) attached to the top housing.

Item 4. The platform of 3 wherein the top housing comprises a monolithic planar surface (1120) and the bottom housing comprises a monolithic planar surface (1123).

Item 5. The platform of 4 further comprising a planar top surface (1110) attached to the top housing (1120)

Item 6. A monolith platform (1100) for stabilizing a laptop or similar item used within a moving vehicle, the monolith platform comprising a planar top surface (1110) attached to a monolithic top housing (1120), the monolithic top housing attached to a plurality of slides (702); the plurality of slides also attached to a monolithic bottom housing (1123), the monolithic bottom housing comprising a spring anchor point (807) attached to a first end of a spring (703) with a second end of the spring attached to a top housing anchor point (707)

Item 7. The platform of 6 further comprising a slide latch (705) attached to the monolithic top housing (1120).

What is claimed is:

1. A platform (600) for stabilizing a laptop or similar item used within a moving vehicle, the platform comprising:
   a) a right side (600a) and a left side (600b) with the right side comprising a right hand top surface (601a) and the left side comprising a left hand top surface (601b) with an extension plate (812) slideably connected to the right side and left side;
   b) a first top housing assembly (701a) attached to a bottom surface of right hand top surface (601a) and a second top housing assembly (701b) attached to a bottom surface of the left hand top surface (601b), the first and second top housing assemblies each comprising a first and second slide (702);
   a spring (703) with the spring attached to a spring anchor point (707) the spring anchor point attached to the top housing and the spring attached to a spring anchor point (807) of a bottom housing (800).

2. The platform of claim 1 further comprising an extension plate latch (803) attached to attached to each side of the platform bottom housing and a top housing slide lock latch (705) attached to the top housing; the bottom housing comprising an extension plate guide (802), and an extension plate hard stop (804);
   the platform further comprising top housing magnets (708) attached to the top housing.

3. The platform of claim 1 wherein the top housing comprises a monolithic planar surface (1120) and the bottom housing comprises a monolithic planar surface (1123).

4. The platform of claim 3 further comprising a planar top surface (1110) attached to the top housing (1120).

5. A monolith platform (1100) for stabilizing a laptop or similar item used within a moving vehicle, the monolith platform comprising a planar top surface (1110) attached to a monolithic top housing (1120), the monolithic top housing attached to a plurality of slides (702); the plurality of slides also attached to a monolithic bottom housing (1123), the monolithic bottom housing comprising a spring anchor point (807) attached to a first end of a spring (703) with a second end of the spring attached to a top housing anchor point (707).

6. The monolith platform of claim 5 further comprising a slide latch (705) attached to the monolithic top housing (1120).

\* \* \* \* \*